US008264565B2

(12) United States Patent
Sakaguchi et al.

(10) Patent No.: US 8,264,565 B2
(45) Date of Patent: Sep. 11, 2012

(54) IMAGE PROCESSING DEVICE AND IMAGE PROCESSING METHOD

(75) Inventors: Satoshi Sakaguchi, Osaka (JP); Tadamasa Toma, Osaka (JP)

(73) Assignee: Panasonic Corporation, Osaka (JP)

( * ) Notice: Subject to any disclaimer, the term of this patent is extended or adjusted under 35 U.S.C. 154(b) by 408 days.

(21) Appl. No.: 12/594,625

(22) PCT Filed: Feb. 5, 2009

(86) PCT No.: PCT/JP2009/000438
§ 371 (c)(1),
(2), (4) Date: Oct. 5, 2009

(87) PCT Pub. No.: WO2009/098877
PCT Pub. Date: Aug. 13, 2009

(65) Prior Publication Data
US 2010/0141783 A1      Jun. 10, 2010

(30) Foreign Application Priority Data

Feb. 6, 2008   (JP) .................................. 2008-026159

(51) Int. Cl.
*H04N 5/228*   (2006.01)
*H04N 7/01*    (2006.01)
*H04N 5/76*    (2006.01)
*H04N 5/335*   (2011.01)

(52) U.S. Cl. ............... 348/222.1; 348/459; 348/208.13; 348/208.4; 348/231.99; 348/272

(58) Field of Classification Search .............. 348/222.1, 348/459, 208.13, 208.4, 154
See application file for complete search history.

(56) References Cited

U.S. PATENT DOCUMENTS
5,696,848 A * 12/1997 Patti et al. .................... 382/254
(Continued)

FOREIGN PATENT DOCUMENTS
| JP | 2000-244851 | 9/2000 |
|----|-------------|--------|
| JP | 3458741     | 10/2003 |
| JP | 2005-109968 | 4/2005 |
| JP | 2005-253000 | 9/2005 |
| JP | 2006-074180 | 3/2006 |
| JP | 2007-135133 | 5/2007 |

OTHER PUBLICATIONS

International Search Report issued Mar. 24, 2009 in International (PCT) Application No. PCT/JP2009/000438 with English translation. Yasuda et al., "Basics of Digital Image Compression", Nikkei BP Publishing Center, 1996, pp. 42-47 with partial English translation.

*Primary Examiner* — Chieh M Fan
*Assistant Examiner* — Quang Le
(74) *Attorney, Agent, or Firm* — Wenderoth, Lind & Ponack, L.L.P.

(57) ABSTRACT

An image processing device (200) according to the present invention includes: a shooting period obtaining unit (205) configured to obtain a shooting period; an imaging unit (202) which includes a plurality of pixels each converting light into an electrical signal, and which has a first mode in which a low-resolution image signal is outputted and a second mode in which a high-resolution image signal is outputted, the low-resolution image signal including electrical signals converted by a first number of pixels among the plurality of pixels, the high-resolution image signal including electrical signals converted by a second number of pixels among the plurality of pixels, and the second number being greater than the first number; a control unit (210) configured to cause the imaging unit (202) to operate in the first mode during the shooting period, and to operate in the second mode during a period other than the shooting period; and a super-resolution unit (203) configured to generate a super-resolution image signal by performing a resolution up-converting process on the low-resolution image signal outputted by the imaging unit (202) during the shooting period, using the high-resolution image signal outputted by the imaging unit (202) during the period other than the shooting period.

13 Claims, 22 Drawing Sheets

U.S. PATENT DOCUMENTS

| | | |
|---|---|---|
| 6,804,419 B1 | 10/2004 | Miyake |
| 7,202,892 B1 | 4/2007 | Ogata et al. |
| 7,483,051 B2 * | 1/2009 | Aiso .......................... 348/207.2 |
| 7,548,664 B2 * | 6/2009 | Souchard ...................... 382/300 |
| 7,593,037 B2 * | 9/2009 | Matsumoto et al. ..... 348/208.13 |
| 2005/0068434 A1 | 3/2005 | Hatano |
| 2005/0219642 A1 * | 10/2005 | Yachida et al. ............... 358/448 |
| 2006/0044408 A1 | 3/2006 | Nishizawa |
| 2007/0200935 A1 | 8/2007 | Ogata et al. |

\* cited by examiner

IMAGE PROCESSING DEVICE AND IMAGE PROCESSING METHOD

TECHNICAL FIELD

The present invention relates to image processing devices and image processing methods, and particularly to an image processing device which performs a resolution up-converting process on low-resolution image data imaged by using an imaging device.

BACKGROUND ART

In recent years, image shooting apparatuses such as digital still cameras and digital video cameras increasingly include an imaging sensor having multiple pixels in order to shoot a high-definition still image. However, shooting an image at a high frame rate by using the imaging sensor such as continuous shooting and moving picture shooting increases an amount of data read from the imaging sensor per unit time. More specifically, the amount of data read from the imaging sensor per unit time is determined by a multiplication between the number of pixels in a frame and a frame rate. Accordingly, an imaging sensor in which an amount of data read per unit time is limited makes it difficult to perform image shooting at a high frame rate while reading data of all the pixels.

On the other hand, Patent Reference 1 discloses a technique of achieving a high frame rate while reducing an amount of data read per unit time by thinning pixels to be read from the imaging sensor. Here, a frame indicates a still image at a given time.

Further, Patent Reference 2 discloses an example of a super-resolution technique of generating a high-resolution frame from thinned low-resolution frames.

The following will describe a structure of an image processing device 100 which is structured by combing the above references and an image processing method.

FIG. 1 is a block diagram showing the structure of the image processing device 100. The image processing device 100 shown in FIG. 1 includes: a reading scheme switching unit 101 which receives a shooting mode signal 120 as an input, and outputs a reading scheme indicating signal 121; an imaging unit 102 which receives the reading scheme indicating signal 121 as an input, and outputs an image signal 122; and a super-resolution unit 103 which receives the image signal 122 as an input, and outputs an output image signal 129.

When the shooting mode signal 120 indicates that a current shooting mode is a mode for reading an image at high speed (hereinafter, referred to as high-speed reading mode), the reading scheme switching unit 101 outputs the reading scheme indicating signal 121 indicating thinned-pixels reading to the imaging unit 102. In addition, the reading scheme switching unit 101 outputs the reading scheme indicating signal 121 indicating all-pixels reading to the imaging unit 102 in a case (hereinafter, referred to as regular reading mode) other than the above case.

Here, the high-speed reading mode is, for example, a high-speed continuous shooting mode in which, for example, 8 frames are shot per second, and also a high-frame rate moving picture shooting mode in which, for instance, 120 frames are shot per second. The regular reading mode is, for instance, a regular shooting mode in which continuous shooting is not performed, a low-speed continuous shooting mode in which, for example, 2 frames are shot per second, and a regular moving picture shooting mode in which, for instance, 30 frames are shot per second.

The imaging unit 102 includes an image sensor such as a CCD (Charge Coupled Device) or CMOS (Complementary Metal Oxide Semiconductor) image sensor. When the reading scheme indicating signal 121 indicates the all-pixels reading, the imaging unit 102 outputs, as the image signal 122, a signal corresponding to all the pixels included in a frame. In addition, when the reading scheme indicating signal 121 indicates the thinned-pixels reading, the imaging unit 102 outputs, as the image signal 122, a signal corresponding to thinned pixels whose number is smaller than the number of all the pixels included in the frame.

When the reading scheme indicating signal 121 indicates the all-pixels reading, the super-resolution unit 103 directly outputs the image signal 122 as the output image signal 129. In addition, when the reading scheme indicating signal 121 indicates the thinned-pixels reading, the super-resolution unit 103 generates a high-resolution frame using temporally continuous frames included in the thinned-pixels read and low-resolution image signal 122, by performing, for instance, a super-resolution process described in Patent Reference 2, and outputs the generated high-resolution frame as the output image signal 129.

The following will describe an internal structure and operations of the super-resolution unit 103 with reference to FIG. 2. FIG. 2 is a block diagram showing the structure of the super-resolution unit 103.

The super-resolution unit 103 shown in FIG. 2 includes: a frame memory 144 which receives an image signal 122 as an input, and outputs a stored image signal 131; a motion detecting unit 143 which receives the image signal 122 and the stored image signal 131 as inputs, and outputs a motion information signal 132; a super-resolution performing unit 142 which receives the image signal 122 and the stored image signal 131 as inputs, and outputs a super-resolution image signal 133; and a signal switching unit 141 which receives a reading scheme indicating signal 121, the image signal 122, and the super-resolution image signal 133 as inputs, and outputs an output image signal 129.

A frame at the time of reading all the pixels or thinned pixels which is included in the image signal 122 is temporarily stored into the frame memory 144, and the frame memory 144 outputs the stored frame as the stored image signal 131.

The motion detecting unit 143 detects a motion between a current frame of the image signal 122 and a previously stored frame of the stored image signal 131, and outputs the motion information signal 132 indicating an amount of motion of one or more objects within the current frame.

The super-resolution performing unit 142 outputs the high-resolution super-resolution image signal 133 by performing a super-resolution process on the thinned-pixels read and low-resolution image signal 122 using the motion information signal 132.

When the reading scheme indicating signal 121 indicates the all-pixels reading, the signal switching unit 141 outputs the image signal 122 as the output image signal 129. Furthermore, when the reading scheme indicating signal 121 indicates the thinned-pixels reading, the signal switching unit 141 outputs the super-resolution image signal 133 as the output image signal 129.

Next, the following will describe a specific operation example of the image processing device 100 with reference to FIGS. 3 and 4. FIG. 3 is a diagram showing operations of the image processing device 100 in a regular reading mode. FIG.

4 is a diagram showing operations of the image processing device 100 in a high-speed reading mode.

A shooting performing signal 124 is a signal which indicates value 1 during a shooting period, and which indicates value 0 in a case other than the above. The reading scheme indicating signal 121 is a signal which indicates value 1 in the case of the all-pixels reading, and which indicates value 0 in a case other than the above. The shooting mode signal 120 is a signal which indicates value 1 in the high-speed reading mode, and which indicates value 0 in the regular reading mode.

First, the operations of the image processing device 100 when the shooting mode signal 120 indicates value 0, that is, in the regular reading mode will be described. As shown in FIG. 3, when the shooting mode signal 120 indicates value 0, the reading scheme switching unit 101 outputs the reading scheme indicating signal 121 indicating value 0. The imaging unit 102 performs the all-pixels reading and at the same time spends time Tf outputting a frame as the image signal 122. Here, because a transfer time of the frame is Tf, an interval to a start of next frame transfer needs to be Tf at minimum.

Next, the operations of the image processing device 100 when the shooting mode signal 120 indicates value 1, that is, in the high-speed reading mode will be described. As shown in FIG. 4, when the shooting mode signal 120 indicates value 1, the reading scheme switching unit 101 outputs the reading scheme indicating signal 121 indicating value 1. The imaging unit 102 performs the thinned-pixels reading and at the same time spends time Tp outputting a frame as the image signal 122. Here, although image quality deteriorates in comparison with an all-pixels read image because the thinned-pixels reading is performed in the high-speed reading mode, due to Tp<Tf, it is possible to shoot an image having a higher frame rate in comparison with the case where the shooting mode signal 120 indicates value 0.

Next, operations of the image processing device 100 will be described with reference to FIG. 5. FIG. 5 is a flow chart of an image processing method of the image processing device 100.

First, the reading scheme switching unit 101 determines whether or not a current shooting mode is the high-speed reading mode (Step S1). When the current shooting mode is the high-speed reading mode (Yes in S1), the reading scheme switching unit 101 indicates the thinned-pixels reading to the imaging unit 102 (Step S5), and when the current shooting mode is the regular reading mode (No in S1), the reading scheme switching unit 101 indicates the all-pixels reading to the imaging unit 102 (Step S2).

When the all-pixels reading is indicated, the imaging unit 102 reads a signal of all the pixels included in a frame, and outputs the signal as the image signal 122 (Step S3). Next, the super-resolution unit 103 directly outputs the read image signal 122 as the output image signal 129. (Step S4).

On the other hand, when the thinned-pixels reading is indicated at Step S5, the imaging unit 102 reads a signal of thinned pixels whose number is smaller than all the pixels included in the frame (Step S6). Next, the super-resolution unit 103 generates a high-resolution frame using temporally continuous frames included in the thinned-pixels read and low-resolution image signal 122, by performing, for instance, a super-resolution process described in Patent Reference 2, and outputs the generated high-resolution frame as the output image signal 129 (Step S7).

FIG. 6 is a diagram showing an example of a conventional super-resolution process. As shown in FIG. 6, for instance, a frame of a high-resolution image is generated using temporally continuous three frames of low-resolution images.

Patent Reference 1: Japanese Unexamined Patent Application Publication No. 2005-109968
Patent Reference 2: Japanese Unexamined Patent Application Publication No. 2000-244851

SUMMARY OF THE INVENTION

Problems that Invention is to Solve

However, because an image transfer speed of the image sensor is limited, the above-described image processing device 100 reduces the number of transfer pixels per frame in exchange of an increase in the number of transfer frames per unit time in the high-speed reading mode. As a result, there is a problem that a deterioration in image quality such as reduction in resolution occurs in the image processing device 100.

FIG. 7 is a diagram showing an example of a super-resolution process of the image processing device 100. Because the image processing device 100 restores a thinned image through the super-resolution process, as shown in FIG. 7, for example, pixel values corresponding to thinned pixels may not be accurately restored through the super-resolution process.

In response, an objective of the present invention is to provide an image processing device, an image processing method, and a program which suppress the deterioration in image quality in the high-speed reading mode.

Means to Solve the Problems

In order to achieve the above objective, an image processing device according to the present invention includes: a shooting period obtaining unit configured to obtain a shooting period; an imaging unit which includes a plurality of pixels each converting light into an electrical signal, and which has a first mode in which a low-resolution image signal is outputted and a second mode in which a high-resolution image signal is outputted, the low-resolution image signal including electrical signals converted by a first number of pixels among the plurality of pixels, the high-resolution image signal including electrical signals converted by a second number of pixels among the plurality of pixels, and the second number being greater than the first number; a control unit configured to cause the imaging unit to operate in the first mode during the shooting period obtained by the shooting period obtaining unit, and to operate in the second mode during a period other than the shooting period; and a super-resolution unit configured to generate a super-resolution image signal by performing a resolution up-converting process on the low-resolution image signal outputted by the imaging unit during the shooting period, using the high-resolution image signal outputted by the imaging unit during the period other than the shooting period.

With this structure, the image processing device according to the present invention shoots a low-resolution image during the shooting period, and generates a high-resolution image by performing a super-resolution process on the low-resolution image. Consequently, the image processing device according to the present invention shoots the high-resolution image while maintaining a high-frame rate.

Further, the image processing device according to the present invention shoots the high-resolution image during a period other than the shooting period, and performs the super-resolution process using the high-resolution image. As a result, it is possible to improve the image quality of the high-resolution image that is generated by using the super-resolution process. Moreover, a frame rate during the shooting period is not lowered because the high-resolution image is shot during the period other than the shooting period. As stated above, the image processing device according to the present invention suppresses a deterioration in image quality in the high-speed reading mode while maintaining the high-frame rate.

Furthermore, the control unit may cause the imaging unit to operate in the second mode after an end of the shooting period, and the super-resolution unit may perform the resolution up-converting process on the low-resolution image signal outputted by the imaging unit during the shooting period, using the high-resolution image signal outputted by the imaging unit after the end of the shooting period.

With this structure, the image processing device according to the present invention shoots the high-resolution image after the shooting period, and performs the super-resolution process using the high-resolution image. Here, when the high-resolution image is shot before the shooting period, a frame rate of an image shot before the shooting period is lowered. For example, assuming cases such as a case where an image shot by the imaging unit is displayed on a monitor and so on and a user performs shooting while looking at the image, the image shot before the shooting period preferably has a high frame rate so that the user performs the shooting at more optimal timing. The image processing device according to the present invention avoids unnatural motion in an image on a monitor display before a start of shooting, by shooting the high-resolution image after the shooting period. Accordingly, the user can perform shooting comfortably without losing a shooting opportunity.

Moreover, the control unit may cause the imaging unit to operate in the second mode before a start of the shooting period, and the super-resolution unit may perform the resolution up-converting process on the low-resolution image signal outputted by the imaging unit during the shooting period, using the high-resolution image signal outputted by the imaging unit before the start of the shooting period.

With this structure, the image processing device according to the present invention shoots the high-resolution image before the shooting period, in addition to after the shooting period. Accordingly, the image processing device according to the present invention performs the super-resolution process using a temporally closer high-resolution image, that is, a high-resolution image having a high correlation. Thus, the image processing device according to the present invention generates an image having higher image quality through the super-resolution process.

Furthermore, the image processing device may further include a monitor display unit which displays, on a monitor, an image represented by the low-resolution image signal, an image represented by the high-resolution image signal, or an image represented by the super-resolution image signal, wherein the control unit may cause the imaging unit to operate in the second mode before the start of the shooting period when the monitor display unit does not display, on the monitor, the image represented by the low-resolution image signal, the image represented by the high-resolution image signal, or the image represented by the super-resolution image signal, and to operate in the first mode before the start of the shooting period when the monitor display unit displays, on the monitor, the image represented by the low-resolution image signal, the image represented by the high-resolution image signal, or the image represented by the super-resolution image signal.

With this structure, even a time is before the shooting period, in the case of currently performing a monitor display, the image processing device according to the present invention does not cause the image unit to operate in the second mode. As a result, because the frame rate is not lowered on the monitor display before the start of shooting, the image processing device according to the present invention avoids the unnatural motion in the image on the monitor display before the start of shooting. Accordingly, the user can perform shooting comfortably without losing the shooting opportunity.

Moreover, the shooting period obtaining unit may obtain a shooting preparation signal indicating whether or not a shutter button is pressed halfway, and the control unit may cause the imaging unit to operate in the second mode when the shooting preparation signal indicates that the shutter button is pressed halfway.

With this structure, the image processing device according to the present invention shoots the high-resolution image to be used for the super-resolution process at a timing immediately before the start of shooting. Consequently, because a temporal distance between the high-resolution image to be used for the super-resolution process and the low-resolution image shot during the shooting period becomes short, a correlation between the high-resolution image to be used for the super-resolution process and the low-resolution image shot during the shooting period becomes higher. Thus, the image processing device according to the present invention generates the image having the higher image quality through the super-resolution process.

Furthermore, the control unit may further cause the imaging unit to operate in the second mode during the shooting period when an amount of a motion in the image represented by the low-resolution image signal is smaller than a predetermined value, and the super-resolution unit may further perform the resolution up-converting process on the low-resolution image signal outputted by the imaging unit during the shooting period, using the high-resolution image signal outputted by the imaging unit during the shooting period.

With this structure, even a time is in the shooting period, when an amount of a motion of an object is small, the high-resolution image is shot. Although a frame rate of an image shot during the shooting period is lowered when a high-resolution image is shot during the shooting period, because an image for which the frame rate is lowered is an image having no motion, it is possible to suppress subjective image degradation such as an unstable motion in an image. On the other hand, shooting the high-resolution image during the shooting period makes it possible to improve the image quality of the high-resolution image. Further, using the high-resolution image for the super-resolution process makes it possible to improve image quality of other image frames.

Moreover, the control unit may determine that the amount of the motion in the image represented by the low-resolution image signal is smaller than the predetermined value when a sum of absolute differences in each of pixel values between a temporally preceding or next image frame and a current image frame, both of which are included in the image represented by the low-resolution image signal, is smaller than a predetermined value.

Furthermore, the super-resolution unit may motion-compensate between a temporally preceding or next image frame and a current image frame, both of which are included in the image represented by the low-resolution image signal, and perform the resolution up-converting process on the low-resolution image signal outputted by the imaging unit during the shooting period, using the temporally preceding or next image frame and the current image frame that are motion-compensated, and the control unit may determine that the amount of the motion in the image represented by the low-resolution image signal is smaller than the predetermined value when a sum of absolute differences in each of pixel values between the temporally preceding or next image frame and a current image frame that are motion-compensated is smaller than a predetermined value when magnitude of a motion vector indicating an amount of a motion in the motion-compensation is smaller than a predetermined value, or in both cases.

Moreover, the super-resolution unit may preferentially use an image frame that is temporally closest to a current image frame included in the low-resolution image signal, among image frames included in the high-resolution image signal, so as to perform the resolution up-converting process on the current image frame.

With this structure, the image processing device according to the present invention performs the super-resolution process using a high-resolution image frame that is the temporally closest to the current image frame, that is, a high-resolution image having a high correlation. Thus, the image processing device according to the present invention generates the image having the higher image quality through the super-resolution process.

Furthermore, the control unit may cause the imaging unit to periodically operate in the second mode during the shooting period, and the super-resolution unit may perform the resolution up-converting process on the low-resolution image signal outputted by the imaging unit during the shooting period, using the high-resolution image signal outputted by the imaging unit during the shooting period.

With this structure, the image processing device according to the present invention performs the super-resolution process using the temporally closer high-resolution image frame, that is, the high-resolution frame having the high correlation. Thus, the image processing device according to the present invention generates the image having the higher image quality through the super-resolution process.

Moreover, the control unit may cause the imaging unit to operate in the second mode immediately after the end of the shooting period, and the super-resolution unit may perform the resolution up-converting process on the low-resolution image signal outputted by the imaging unit during the shooting period, using the high-resolution image signal outputted by the imaging unit immediately after the end of the shooting period.

With this structure, a temporal distance between a high-resolution image shot after the shooting period and a low-resolution image shot during the shooting period becomes shorter. Consequently, a correlation between the high-resolution image shot after the shooting period and the low-resolution image shot during the shooting period becomes higher. Thus, the image processing device according to the present invention generates the image having the higher image quality through the super-resolution process.

Furthermore, the imaging unit may output the low-resolution image signal at a first frame rate in the first mode, and the high-resolution image signal at a second frame rate in the second mode, the second frame rate being slower than the first frame rate.

It is to be noted that the present invention can be realized not only as the above-mentioned image processing device but also as an image processing method having characteristic units as steps and a program causing a computer to execute such characteristic steps. Needless to say, it is possible to distribute such a program via a recording medium such as CD-ROM and a transmission medium such as the Internet.

Further, the present invention can be realized as a large-scale integration (LSI) which fulfils part or all of the functions of the image processing device and as a camera including the image processing device.

Effects of the Invention

As described above, the present invention provides the image processing device, the image processing method, and the program which suppress the deterioration in image quality in the high-speed reading mode.

Figure 1:
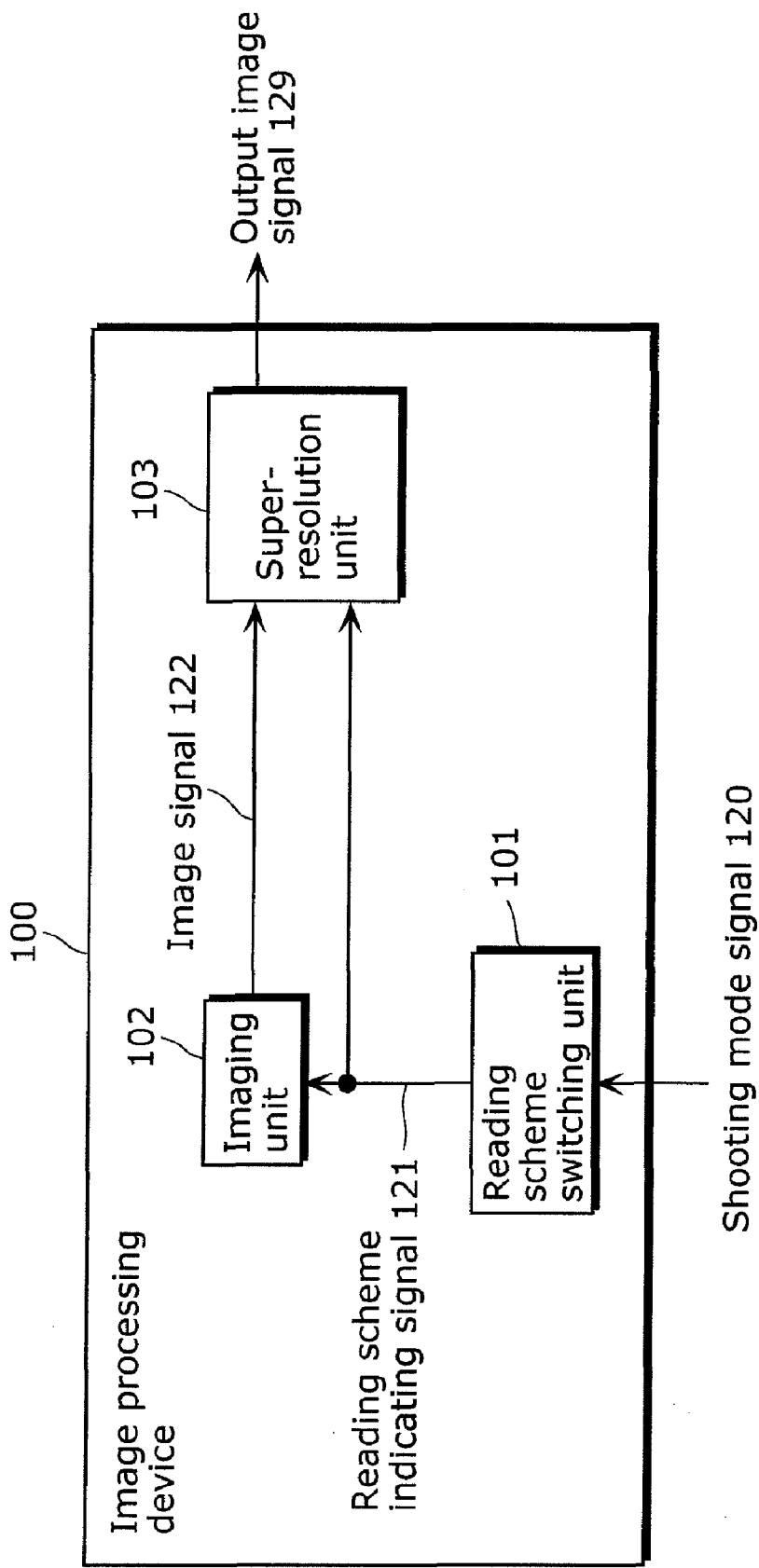
FIG. 1 is a block diagram showing a conventional image processing device.
Figure 2:
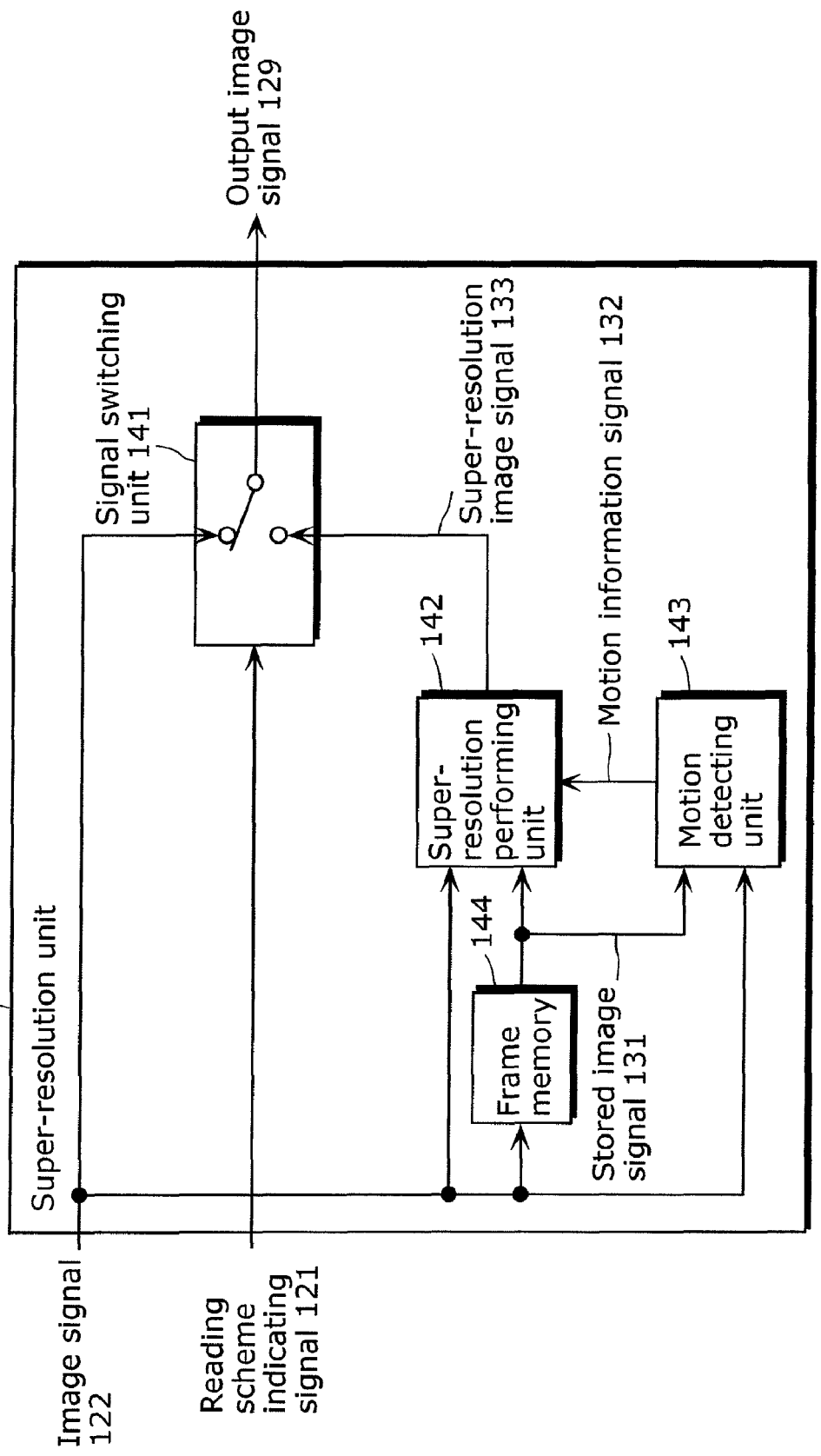
FIG. 2 is a block diagram showing a conventional super-resolution unit.
Figure 3:
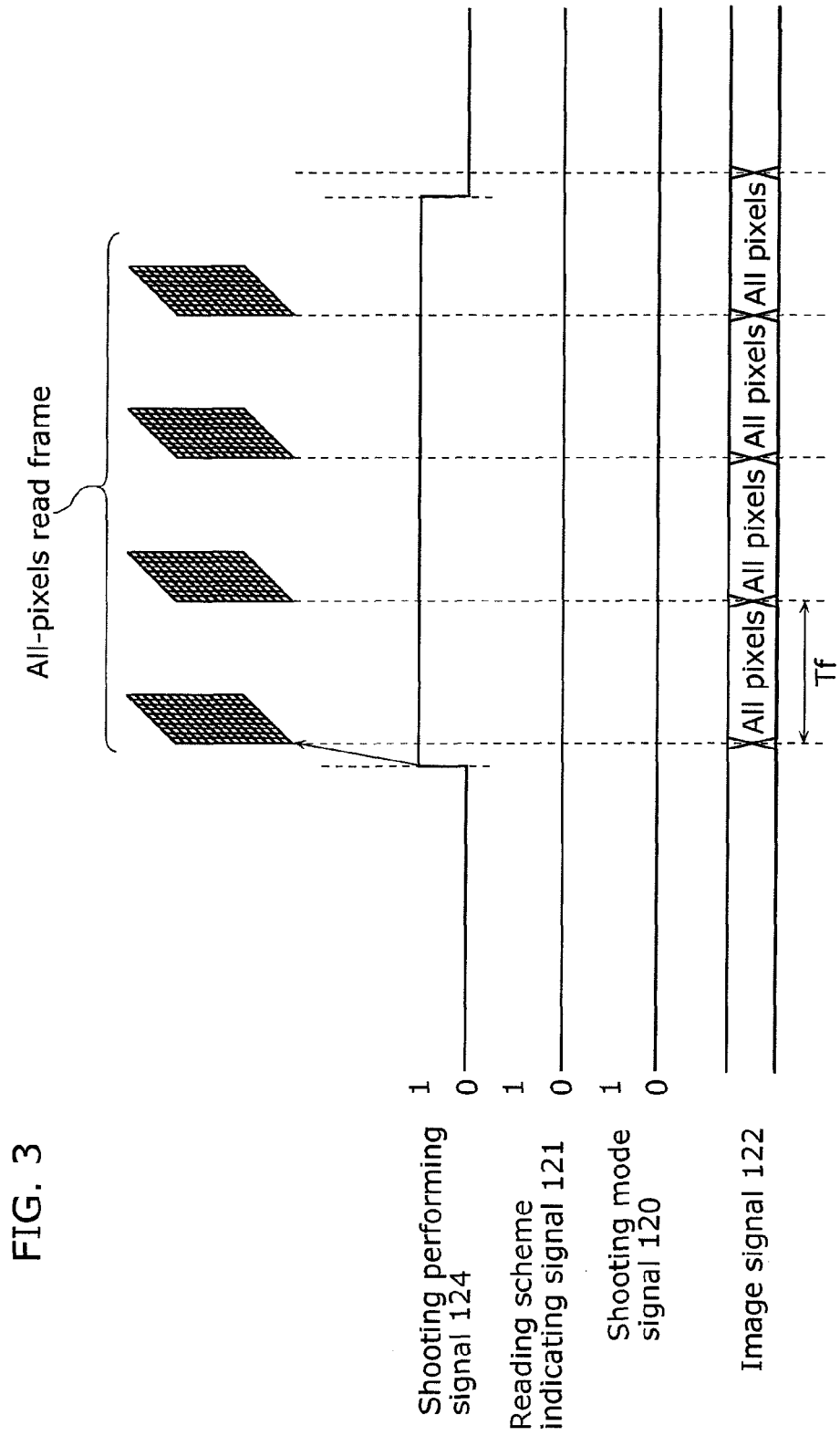
FIG. 3 is a diagram showing operations of the conventional image processing device in a regular reading mode.
Figure 4:
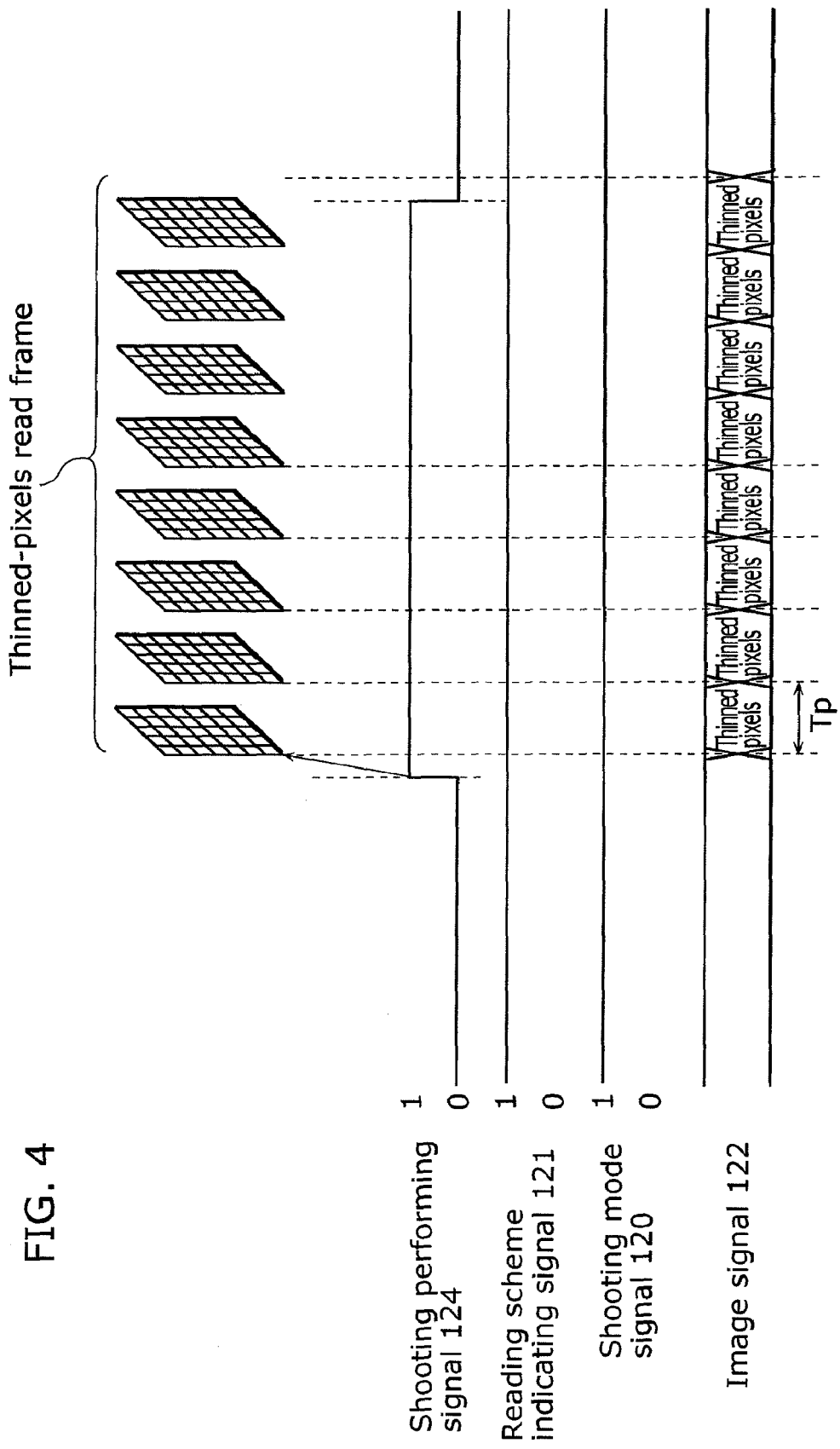
FIG. 4 is a diagram showing operations of the conventional image processing device in a high-speed reading mode.
Figure 5:
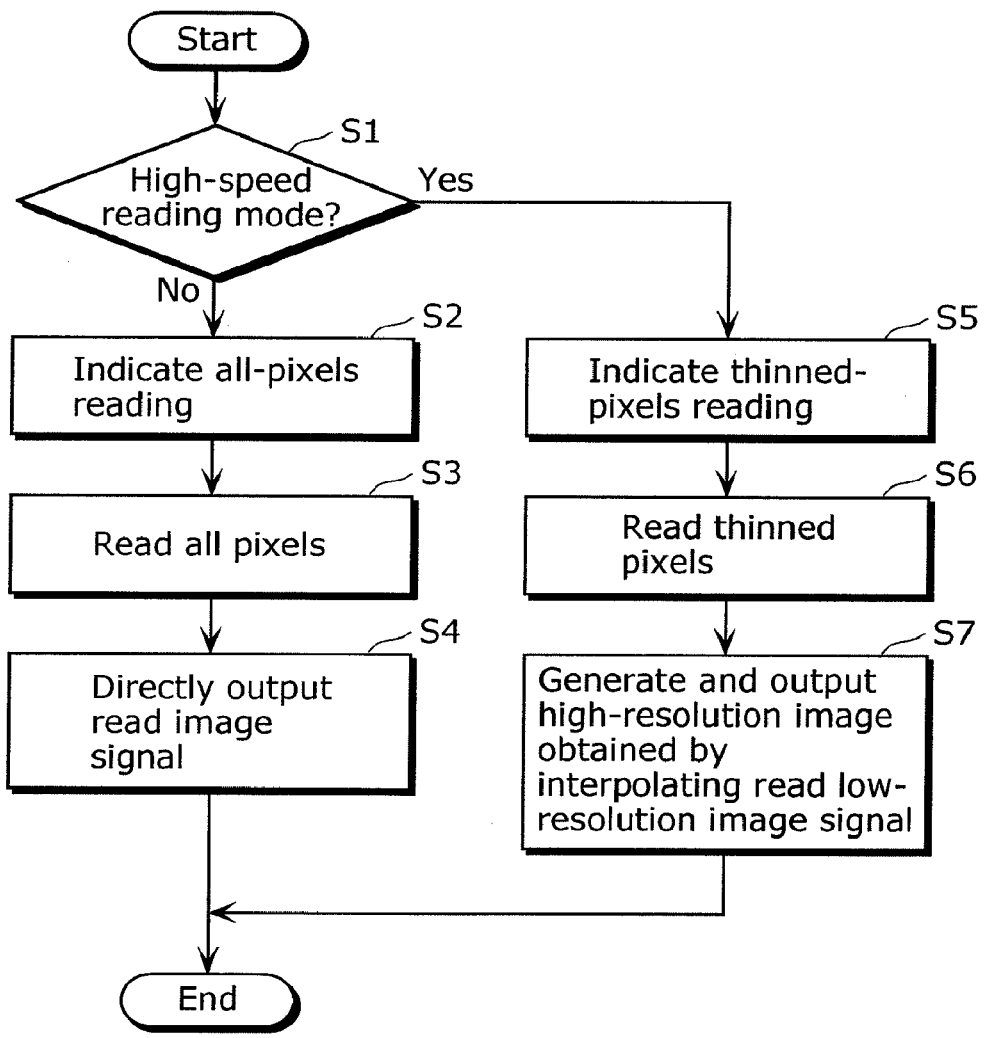
FIG. 5 is a flow chart showing processes of the conventional image processing device.
Figure 6:
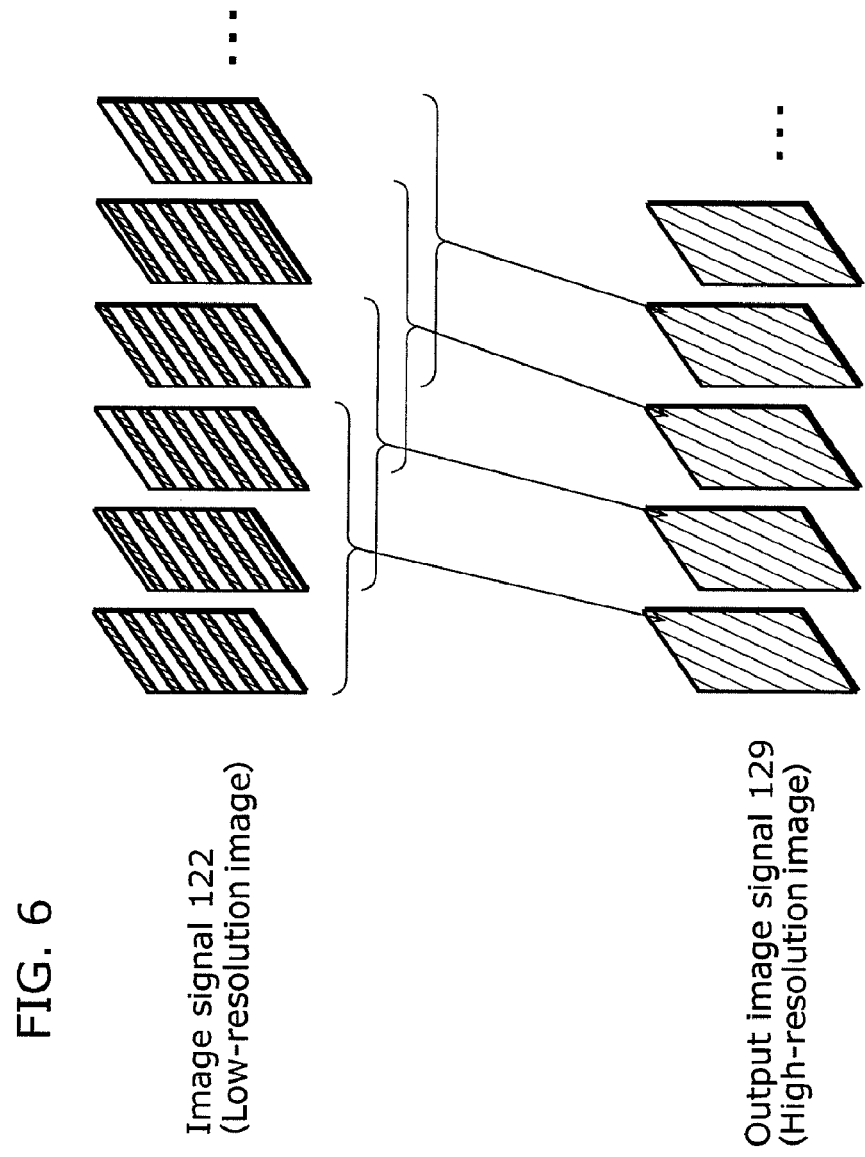
FIG. 6 is a diagram showing a super-resolution process of the conventional image processing device.
Figure 7:
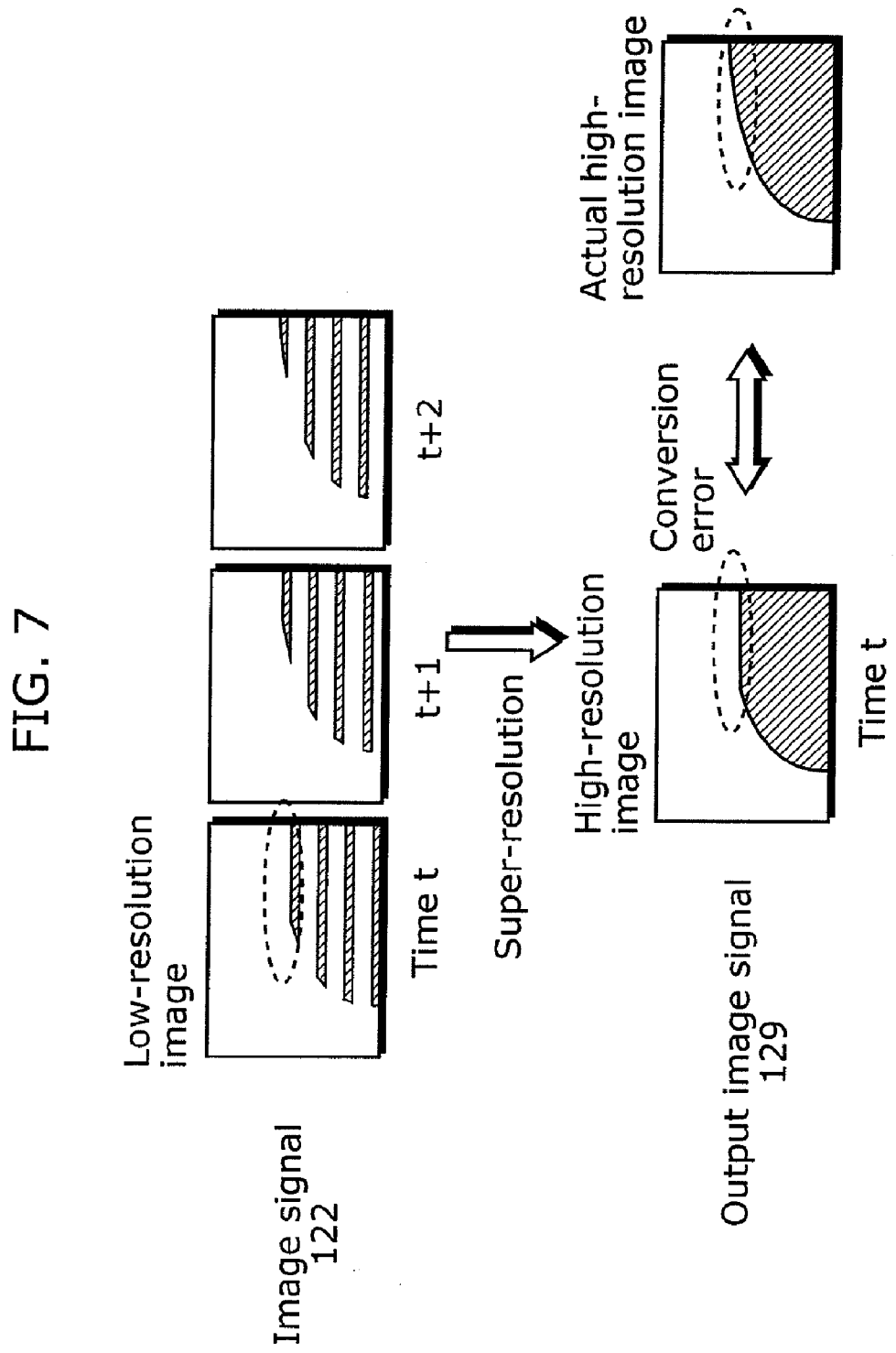
FIG. 7 is a diagram showing the super-resolution process of the conventional image processing device.

NUMERICAL REFERENCES 100, 200, 300 Image processing device
101, 201 Reading scheme switching unit
102, 202 Imaging unit
103, 203, 303 Super-resolution unit
120, 220 Shooting mode signal
121, 221 Reading scheme indicating signal
122, 222 Image signal
124, 224 Shooting performing signal
129, 229 Output image signal
131, 231 Stored image signal
132, 232 Motion information signal
133, 233 Super-resolution image signal
141, 241 Signal switching unit
142, 242 Super-resolution performing unit
143, 243 Motion detecting unit
144, 244, 344 Frame memory
204, 304 Determining unit
205 Shooting period obtaining unit
206 Shooting mode obtaining unit
210 Control unit
223 Shooting preparation signal
225 All-pixels reading indicating signal
226 Motion determining signal
227 Shooting end signal
307 Monitor display unit
327 Monitor validation signal
334 Frame information signal
335 Frame selection signal
345 Time difference determining unit
450 Flexible disk
451 Disk
452 Case
453 Track
454 Sector
460 Computer system
461 Flexible disk drive
500 Digital camera
501 Shutter button
502 Lens
503 Monitor screen
504 Viewfinder
505 Shooting mode switching dial
506 Continuous shooting mode switching button
507 Monitor display button

DETAILED DESCRIPTION OF THE INVENTION

The following will describe in detail an image processing device according to embodiments of the present invention with reference to the drawings.

Embodiment 1

In a high-speed reading mode, an image processing device 200 according to Embodiment 1 of the present invention shoots a high-resolution image during a period other than a shooting period, and performs a super-resolution process on a low-resolution image shot during the shooting period, using the high-resolution image. As a result, the image processing device 200 according to Embodiment 1 of the present invention suppresses a deterioration in image quality in the high-speed reading mode.

Figure 8:
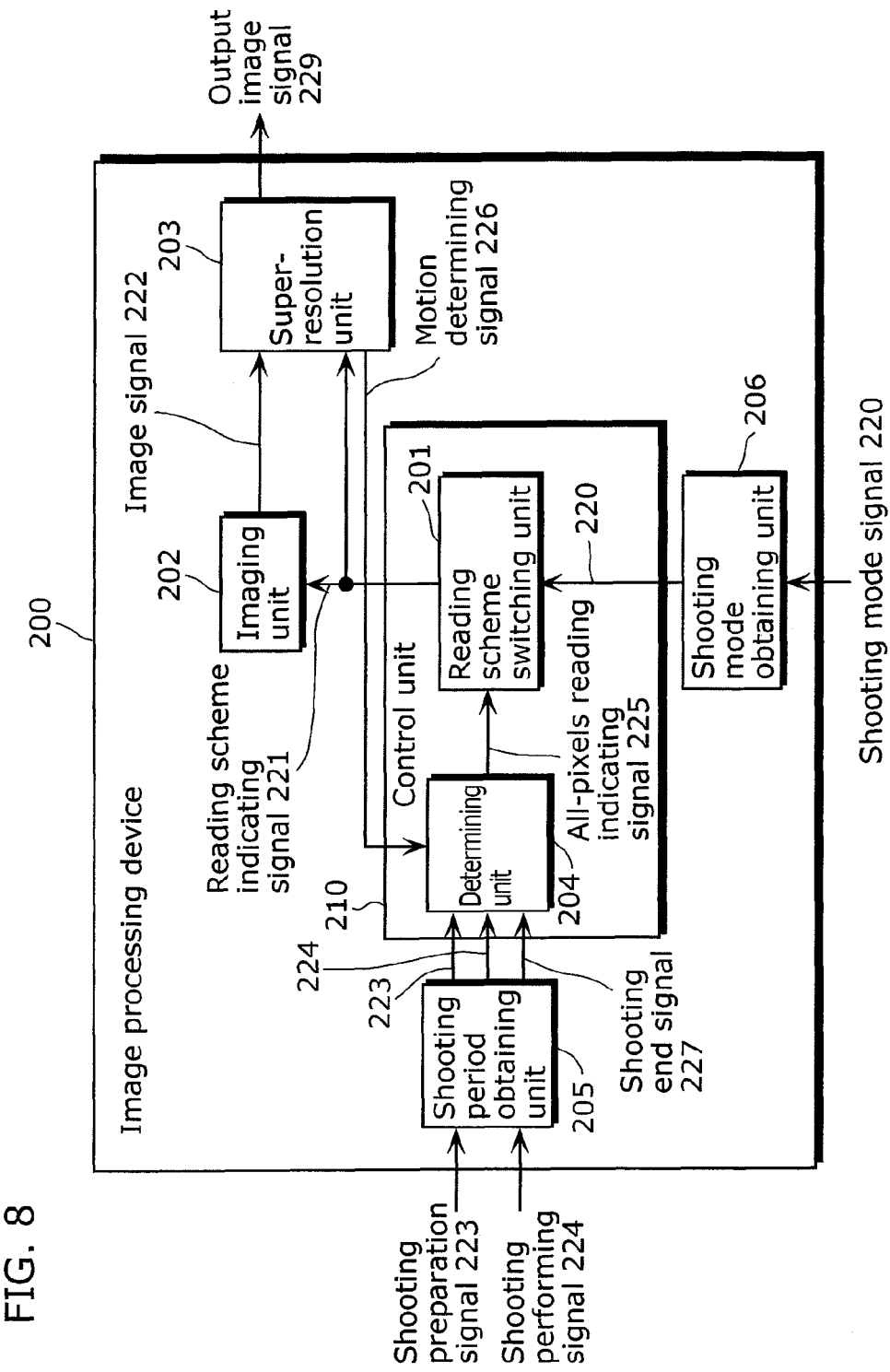
FIG. 8 is a block diagram showing an image processing device according to Embodiment 1 of the present invention.

First, a structure of the image processing device 200 according to Embodiment 1 of the present invention will be described with reference to FIG. 8. FIG. 8 is a diagram showing the structure of the image processing device 200 according to Embodiment 1 of the present invention.

The image processing device 200 shown in FIG. 8 is, for example, a system LSI mounted on a digital still camera. The image processing device 200 receives a shooting mode signal 220, a shooting preparation signal 223, and a shooting performing signal 224 as inputs, and outputs an output image signal 229. Moreover, the image processing device 200 includes a control unit 210, an imaging unit 202, a super-resolution unit 203, a shooting period obtaining unit 205, and a shooting mode obtaining unit 206.

The shooting mode signal 220 is a signal based on a user's operation, and is a signal indicating whether a regular reading mode or a high-speed reading mode is specified with the user's operation. More specifically, when a high-speed continuous shooting mode, in which, for example, 8 frames are shot per second, or a high-frame rate moving picture shooting mode, in which, for instance, 120 frames are shot per second, is specified with the user's operation, the shooting mode signal 220 indicates the high-speed reading mode. Furthermore, when a regular shooting mode, in which continuous shooting is not performed, a low-speed continuous shooting mode, in which, for example, 2 frames are shot per second, or a regular moving picture shooting mode, in which, for instance, 30 frames are shot per second, is specified with the user's operation, the shooting mode signal 220 indicates the regular reading mode.

The shooting performing signal 224 is a signal based on a user's operation, and is a signal indicating a shooting period. For instance, while a user is pressing down a shutter button, the shooting performing signal 224 becomes active, so that the shooting period is indicated.

The shooting preparation signal 223 is a signal based on a user's operation, and is a signal indicating a shooting preparation period. Here, the shooting preparation period is a period immediately before the shooting period. More specifically, while the user is pressing halfway the shutter button, the shooting preparation signal 223 becomes active, so that the shooting preparation period is indicated.

The shooting mode obtaining unit 206 obtains a shooting mode according to a user's operation. More specifically, the shooting mode obtaining unit 206 obtains the shooting mode by obtaining the shooting mode signal 220. In addition, the shooting mode obtaining unit 206 outputs the obtained shooting mode signal 220 to the control unit 210.

The shooting period obtaining unit 205 obtains a shooting period according to a user's operation. More specifically, the shooting period obtaining unit 205 obtains the shooting period by obtaining the shooting preparation signal 223 and the shooting performing signal 224. To put it differently, the shooting period obtaining unit 205 detects a user's shooting start indication and shooting end indication. Moreover, the shooting period obtaining unit 205 outputs the obtained shooting preparation signal 223 and shooting performing signal 224 to the control unit 210. Further, the shooting period obtaining unit 205 generates a shooting end signal 227 indicating a shooting end period, using the shooting performing signal 224, and outputs the generated shooting end signal 227 to the control unit 210. Here, the shooting end period is a period immediately after the end of the shooting period and having predetermined duration.

In addition, the shooting period obtaining unit 205 may obtain a shooting period set by the user prior to shooting. For instance, in the case of timer shooting in which shooting is started after a predetermined time period has passed since the user pressed down the shutter button of the digital still camera, the shooting period obtaining unit 205 obtains a shooting preparation signal 223 and a shooting performing signal 224 that are determined based on a time at which the shutter button is pressed. In this case, the shooting period obtaining unit 205 may also obtain a signal indicating a start time of shooting such as the shooting performing signal 224, and generate the shooting preparation signal 223 using the signal.

The imaging unit 202 converts an optical image into electrical signals, and outputs the converted electrical signals as the image signal 222. More specifically, the imaging unit 202 includes pixels arranged in a matrix, each of which photoelectrically converts light into an electrical signal. The imaging unit 202 has an all-pixels reading mode and a thinned-pixels reading mode.

In the all-pixels reading mode, the imaging unit 202 outputs, as the image signal 222, electrical signals each associated with a corresponding one of all the pixels included in an image frame (hereinafter, simply referred to as "frame"), that is, the electrical signals which are photoelectrically converted by all the pixels among the pixels. Furthermore, in the thinned-pixels reading mode, the imaging unit 202 outputs, as the image signal 222, electrical signals each associated with a corresponding one of thinned pixels whose number is smaller than all the pixels included in the frame, that is, the electrical signals which are photoelectrically converted by some pixels among the pixels.

Figure 9A:
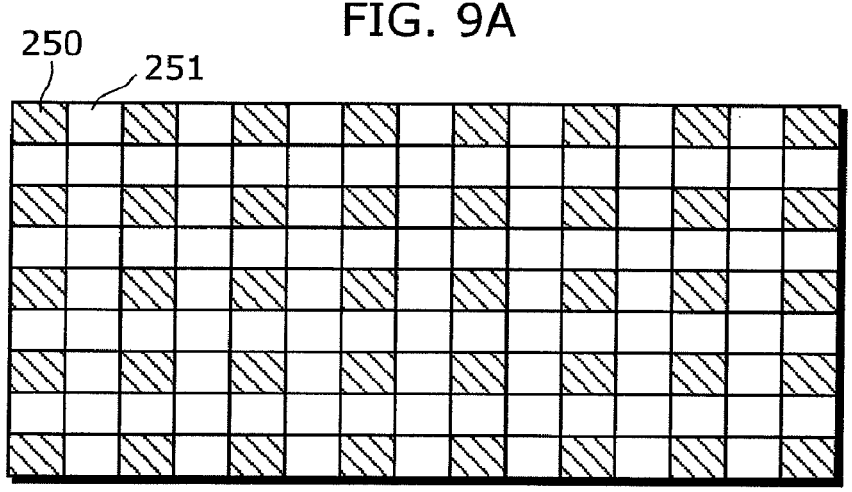
FIG. 9A is a diagram showing an example of thinning pixels according to Embodiment 1 of the present invention.
Figure 9B:
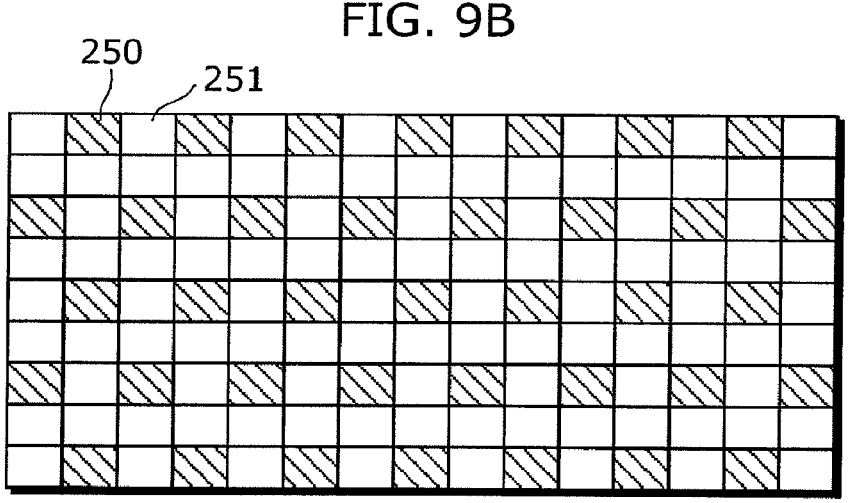
FIG. 9B is a diagram showing an example of thinning pixels according to Embodiment 1 of the present invention.
Figure 9C:
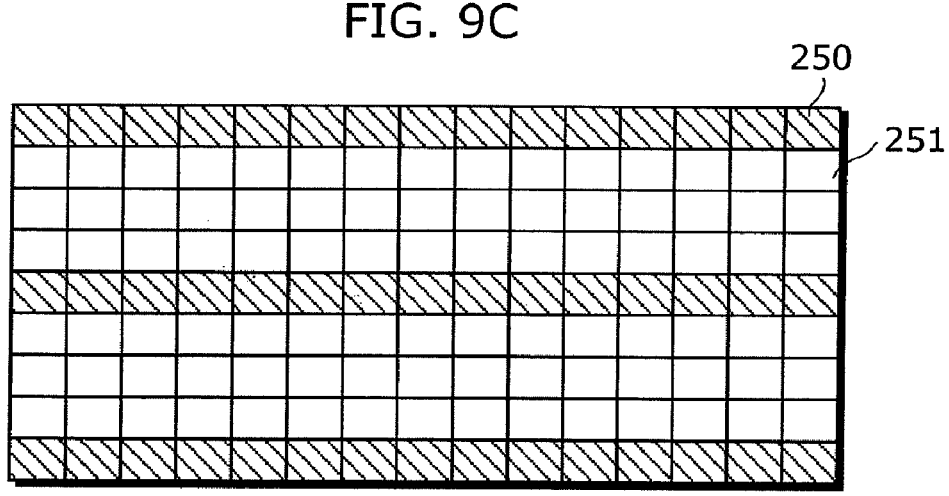
FIG. 9C is a diagram showing an example of thinning pixels according to Embodiment 1 of the present invention.

FIGS. 9A to 9C each are a diagram showing an example of pixels to be read in a thinned-pixels reading mode. Moreover, in FIGS. 9A to 9C, pixels 250 indicated by hatched lines are pixels to be read in the thinned-pixels reading mode, and pixels 251 are pixels not to be read in the thinned-pixels reading mode. As shown in FIGS. 9A to 9C, a pattern of thinning includes a square lattice pattern (FIG. 9A), a diagonal square lattice pattern (FIG. 9B), and a line pattern (FIG. 9C). It is to be noted that the thinning may be preformed with any pattern. In addition, a thinning scheme may differ from frame to frame.

Figure 10A:
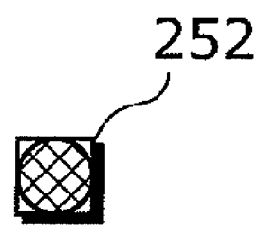
FIG. 10A is a diagram showing a direction of generating a pixel value of thinned pixels according to Embodiment 1 of the present invention.
Figure 10B:
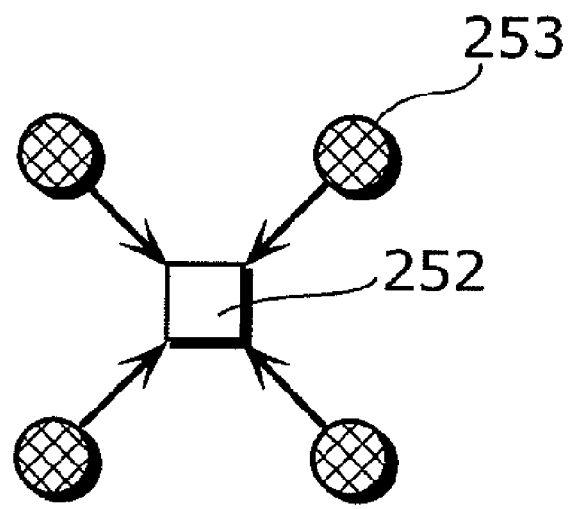
FIG. 10B is a diagram showing a direction of generating a pixel value of thinned pixels according to Embodiment 1 of the present invention.

FIGS. 10A and 10B each are a diagram showing a method for calculating a pixel value to be read in a thinned-pixels reading mode. As shown in FIGS. 10A and 10B, a pixel value corresponding to a pixel position 252 to be read may be pixel value data itself (FIG. 10A) or a summation of pixel value data of pixel positions 253 around the pixel position 252 (FIG. 10B), the summation being performed through a mixture of electric charges and so on.

It is to be noted that in the all-pixels reading mode, the imaging unit 202 may not output electrical signals which are photoelectrically converted by all the pixels included by the imaging unit 202. This is, for instance, a case where a region having an aspect ratio of 16 to 9 from which the top and bottom are cropped is outputted in an image sensor having an aspect ratio of 4 to 3 or a case where a part of a region is cropped with digital zoom. In addition, for other reasons, in the all-pixels reading mode, the imaging unit 202 may output electrical signals which are converted by some pixels. Further, in the all-pixels reading mode, the imaging unit 202 may read thinned pixels, the number of which is greater than the number of thinned pixels in the thinned-pixels reading mode.

Stated differently, the thinned-pixels reading mode is a mode in which the imaging unit 202 outputs electrical signals which are converted by pixels having the first number of pixels among the pixels included by the imaging unit 202. Moreover, the all-pixels reading mode is a mode in which the imaging unit 202 outputs electrical signals which are converted by pixels having the second number of pixels among the pixels included by the imaging unit 202, the second number of pixels being greater than the first number of pixels.

Furthermore, the imaging unit 202 outputs an image at a low frame rate in the all-pixels reading mode, and an image at a frame rate higher in the all-pixels reading mode than in the thinned-pixels reading mode.

When the imaging unit 202 operates in the all-pixels reading mode, the super-resolution unit 203 directly outputs the image signal 222 as the output image signal 229. Moreover, when the imaging unit 202 operates in the thinned-pixels reading mode, the super-resolution unit 203 performs a resolution up-converting (enhancing) process on a low-resolution image signal 222 by performing a super-resolution process on the thinned-pixels read and low-resolution image signal 222, and outputs the high-resolution image as the output image signal 229. In the super-resolution process, the super-resolution unit 203 performs the resolution up-converting process on the low-resolution image signal 222 outputted by the imaging unit 202 in the thinned-pixels reading mode, using a high-resolution image signal 222 outputted by the imaging unit 202 in the all-pixels reading mode.

Further, the super-resolution unit 203 determines whether or not a current frame has a motion by performing motion detection using the image signal 222 of frames at different times. More specifically, the super-resolution unit 203 determines whether or not the motion in the current frame is equal to or greater than a predetermined value. When the motion in the current frame is equal to or greater than the predetermined value, the super-resolution unit 203 determines that the current frame has the motion, and when the motion in the current frame is less than the predetermined value, the super-resolution unit 203 determines that the current frame does not have the motion. It is to be noted that hereinafter, a case where the motion is less than the predetermined value (a case where there is no motion or a case where there is a little motion) is referred to as "no motion". In addition, the super-resolution unit 203 outputs, to the control unit 210, a motion determining signal 226 indicating whether or not the current frame has the motion.

The control unit 210 generates a reading scheme indicating signal 221 based on the shooting mode signal 220, the shooting preparation signal 223, the shooting performing signal 224, the shooting end signal 227, and the motion determining signal 226, and outputs the generated reading scheme indicating signal 221 to the imaging unit 202 and the super-resolution unit 203.

More specifically, in the regular reading mode, the control unit 210 causes the imaging unit 202 to operate in the all-pixels reading mode. Furthermore, in the high-speed reading mode and during the shooting period, the control unit 210 causes the imaging unit 202 to operate in the thinned-pixels reading mode. Moreover, in the high-speed reading mode and during a period other than the shooting period, the control unit 210 causes the imaging unit 202 to operate in the all-pixels reading mode. Furthermore, when the current frame has no motion in the high-speed reading mode and during the shooting period, the control unit 210 causes the imaging unit 202 to operate in the all-pixels reading mode.

The control unit 210 includes a determining unit 204 and a reading scheme switching unit 201.

When the shooting performing signal 224 indicates the period other than the shooting period and the shooting preparation signal 223 indicates the shooting preparation period, the determining unit 204 outputs an all-pixels reading indicating signal 225 indicating the all-pixels reading. Moreover, when the shooting performing signal 224 indicates the period other than the shooting period and the shooting end signal 227 indicates the shooting end period, the determining unit 204 outputs the all-pixels reading indicating signal 225 indicating the all-pixels reading. Further, when the shooting performing signal 224 indicates the shooting period and the motion determining signal 226 indicates that the current frame has no motion, the determining unit 204 outputs the all-pixels reading indicating signal 225 indicating the all-pixels reading. In a case other than the above, that is, when the shooting performing signal 224 indicates the shooting period and the motion determining signal 226 indicates that the current frame has the motion, the determining unit 204 outputs the all-pixels reading indicating signal 225 indicating the thinned-pixels reading. It is to be noted that the determining unit 204 may not receive the motion determining signal 226 as an input, and may not control the all-pixels reading indicating signal 225 according to a motion. Further, the determining unit 204 may periodically output the all-pixels reading indicating signal 225 indicating the all-pixels reading.

When the shooting mode signal 220 indicates the high-speed reading mode and the all-pixels reading indicating signal 225 indicates the all-pixels reading, the reading scheme switching unit 201 outputs the reading scheme indicating signal 221 indicating the all-pixels reading mode. In a case other than the above, that is, when the shooting mode signal 220 indicates the regular reading mode and when the shooting mode signal 220 indicates the high-speed reading mode and the all-pixels reading indicating signal 225 indicates the thinned-pixels reading, the reading scheme switching unit 201 outputs the reading scheme indicating signal 221 indicating the thinned-pixels reading mode. It is to be noted that even when the shooting mode signal 220 does not indicate the high-speed reading mode, the reading scheme switching unit 201 may indicate the thinned-pixels reading for other purposes such as pixel mixture to improve imaging sensitivity.

Figure 11:
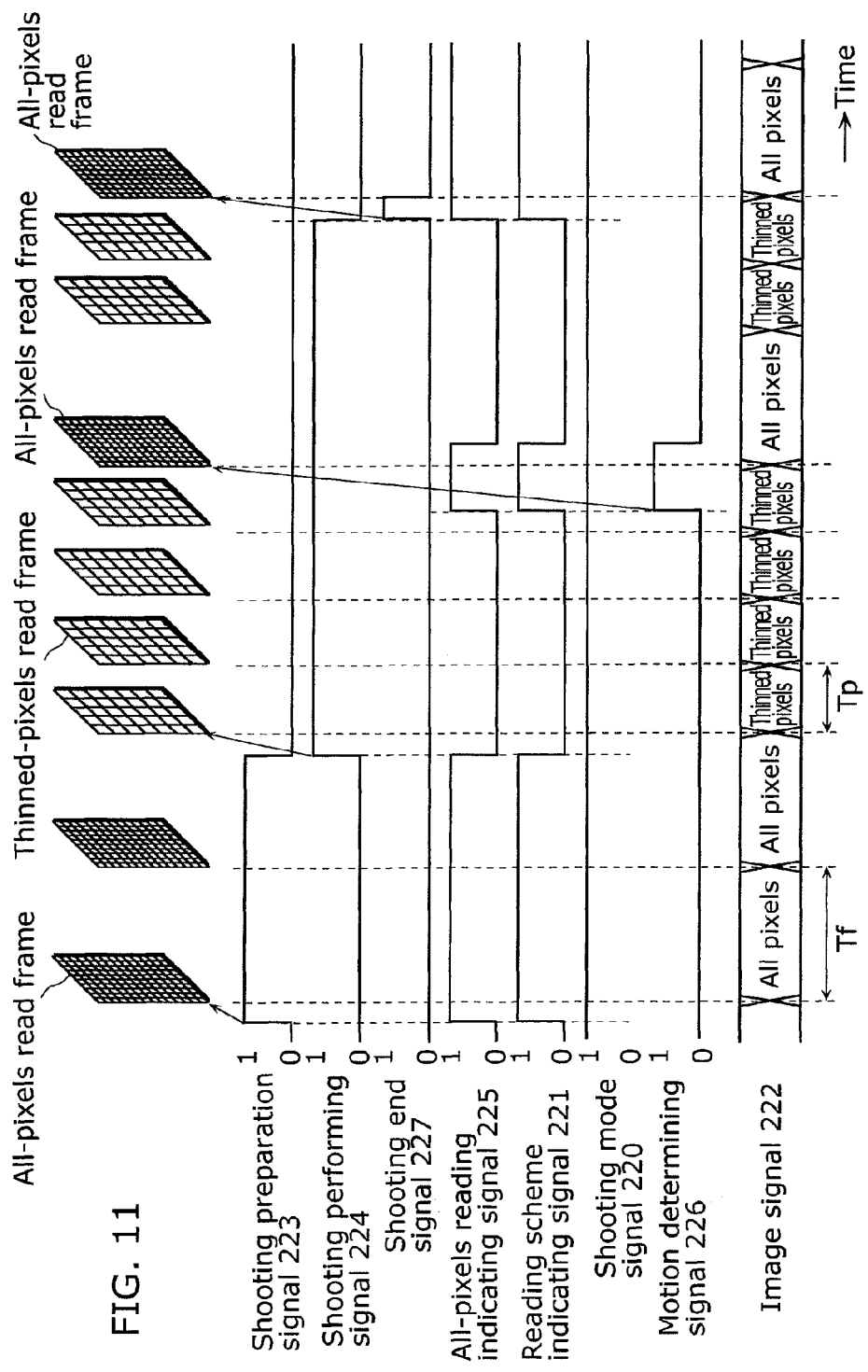
FIG. 11 is a diagram showing operations of the image processing device according to Embodiment 1 of the present invention.

Next, an example of specific operations of the control unit 210 and the imaging unit 202 in the high-speed reading mode will be described with reference to FIG. 11. FIG. 11 is a diagram showing an example of the operations of the control unit 210 and the imaging unit 202 in the high-speed reading mode.

In FIG. 11, the shooting preparation signal 223 is a signal which indicates value 1 during the shooting preparation period, and which indicates value 0 in a period other than the shooting preparation period. The shooting performing signal 224 is a signal which indicates value 1 during the shooting period, and which indicates value 0 in a period other than the shooting period. The shooting end signal 227 is a signal which indicates value 1 during the shooting end period, and which indicates value 0 in a period other than the shooting end period. The all-pixels reading indicating signal 225 is a signal which indicates value 1 when the all-pixels reading is indicated, and which indicates value 0 when the thinned-pixels reading is indicated. The reading scheme indicating signal 221 is a signal which indicates value 1 when the all-pixels reading mode is indicated, and which indicates value 0 when the thinned-pixels reading mode is indicated. The shooting mode signal 220 is a signal which indicates value 1 when the high-speed reading mode is indicated, and which indicates value 0 when the regular reading mode is indicated. The motion determining signal 226 is a signal which indicates value 1 when the current frame has no motion, and which indicates value 0 when the current has the motion. It is to be noted that any of the above-mentioned signals may have an association between a meaning and an actual value other than the above.

Moreover, a description of an operation when the shooting mode signal 220 indicates value 0 is omitted because the operation is the same as in the above-described image processing device 100.

The following will describe operations of the image processing device 200 when the shooting mode signal 220 indicates value 1, that is, in the high-speed reading mode.

First, before shooting is started, the shooting preparation signal 223 indicates value 1 to indicate the shooting preparation period. At this time, the determining unit 204 outputs the all-pixels reading indicating signal 225 indicating value 1. As a result, the reading scheme switching unit 201 outputs the reading scheme indicating signal 221 indicating value 1. Consequently, the imaging unit 202 operates in the all-pixels reading mode. In other words, the imaging unit 202 spends time Tf outputting a frame at the time of reading all the pixels as the image signal 222.

Next, when changing value 1 indicated by the shooting performing signal 224 to value 0 indicates that the shooting is started, the determining unit 204 outputs the all-pixels reading indicating signal 225 indicating value 0. As a result, the reading scheme switching unit 201 outputs the reading scheme indicating signal 221 indicating value 0. Consequently, the imaging unit 202 operates in the thinned-pixels reading mode. In other words, the imaging unit 202 spends time Tp outputting a frame at the time of reading thinned pixels as the image signal 222.

Here, Tp becomes shorter than transfer time Tf because an amount of data of a frame is reduced by as much as thinning of pixels. Accordingly, transferring a next frame can be started faster in the thinned-pixels reading mode than in the all-pixels reading mode. As stated above, causing the imaging unit 202 to operate in the thinned-pixels reading mode during the shooting period makes it possible to shoot an image at high speed during the shooting period.

Furthermore, when it is detected during the shooting period that a frame included in the image signal 222 has no motion, the super-resolution unit 203 outputs the motion determining signal 226 indicating value 1. At this time, the determining unit 204 outputs the all-pixels reading indicating signal 225 indicating value 1. As a result, the reading scheme switching unit 201 outputs the reading scheme indicating signal 221 indicating value 1. Consequently, the imaging unit 202 operates in the all-pixels reading mode. In other words, the imaging unit 202 spends time Tf outputting a frame at the time of reading all the pixels as the image signal 222. At this time, a frame rate is lowered during the all-pixels reading because of Tf>Tp. However, it is possible to suppress subjective image degradation such as an unstable motion in an image because an image for which the frame rate is lowered is an image having no motion. On the other hand, performing the all-pixels reading during the shooting period makes it possible to obtain a more high-definition image. As a result, it is possible to improve image quality of an image.

Next, when the shooting period ends, the shooting preparation signal 223 indicates value 0 and at the same time the shooting end signal 227 indicates value 1 to indicate the shooting end period. At this time, the determining unit 204 outputs the all-pixels reading indicating signal 225 indicating value 1. As a result, the reading scheme switching unit 201 outputs the reading scheme indicating signal 221 indicating value 1. Consequently, the imaging unit 202 operates in the all-pixels reading mode. In other words, the imaging unit 202 spends time Tf outputting the frame at the time of reading all the pixels as the image signal 222.

Figure 12:
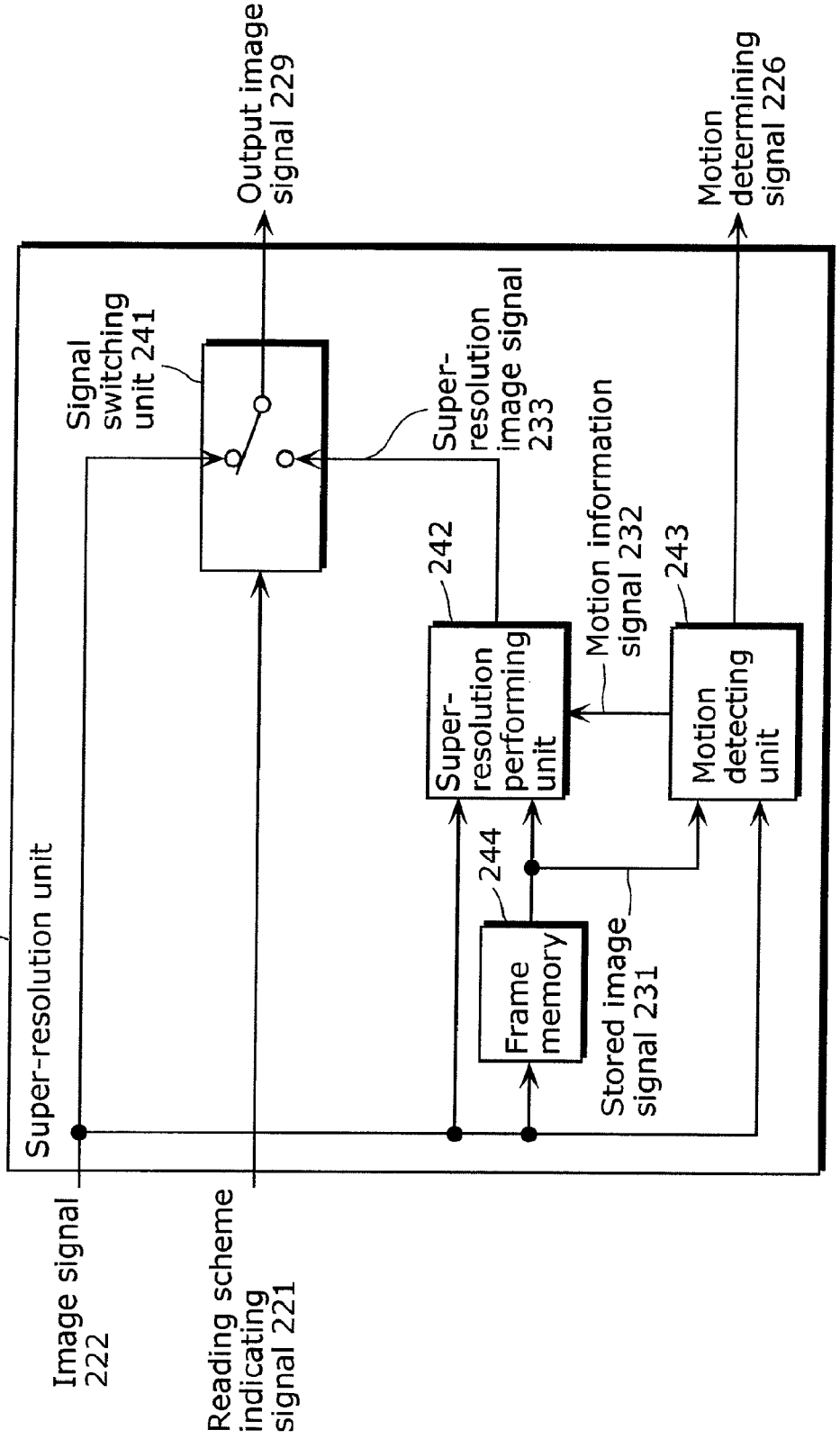
FIG. 12 is a block diagram showing a super-resolution unit according to Embodiment 1 of the present invention.

Next, an internal structure and operations of the super-resolution unit 203 will be described with reference to FIG. 12. FIG. 12 is a block diagram showing the structure of the super-resolution unit 203.

As shown in FIG. 12, the super-resolution unit 203 includes: a frame memory 244 receives an image signal 222 as an input and outputs a stored image signal 231; a motion detecting unit 243 which receives the image signal 222 and the stored image signal 231 as inputs, and outputs a motion information signal 232 and a motion determining signal 226; a super-resolution performing unit 242 which receives the image signal 222 and the stored image signal 231 as inputs, and output a super-resolution image signal 233; and a signal switching unit 241 which receives a reading scheme indicating signal 221, the image signal 222, and the super-resolution image signal 233 as inputs, and outputs an output image signal 229.

A frame at the time of reading all the pixels or thinned pixels which is included in the image signal 222 is temporarily stored into the frame memory 244, and the frame memory 244 outputs the stored frame as the stored image signal 231.

The motion detecting unit 243 detects a motion between a current frame included in the image signal 222 and a previously stored frame included in the stored image signal 231, and outputs the motion information signal 232 indicating an amount of motion of one or more objects within the current frame and the motion determining signal 226 indicating whether or not the current frame has a motion. As regards motion detection methods, for instance, a motion detection method described in "Hiroshi, Yasuda and Watanabe Hiroshi, Basics of Digital Image Compression, Nikkei BP Publishing Center, Section 1.3.2" (Non-patent Reference 1) may be used. It is to be noted that any motion detection method other than the above method may be used. For example, the motion detecting unit 243 performs motion compensation between a temporarily preceding or next frame and a current frame of an image indicated by the low-resolution image signal 222. More specifically, a frame is divided on a block basis, and block matching is performed.

The motion information signal 232 is, for instance, motion vector information when a frame is divided on a block basis and block matching is performed. It is to be noted that a unit of motion detection may not be a block, but may be an area of any shape.

Moreover, the motion determining signal 226 is, for example, a sum of absolute differences in each of pixel values between motion-compensated blocks when the block matching is performed, and is also, for instance, magnitude of a motion vector in the motion compensation when the block matching is performed. It is to be noted that the motion determining signal 226 may be a sum of absolute differences obtained, without performing the motion compensation, by simply comparing each of pixel values in a current frame and each of corresponding co-located pixels values in a previously stored frame. In addition, the motion determining signal 226 and the motion information signal 232 may be an index for an amount of motion derived with a motion detection method other than the above.

Furthermore, the motion determining signal 226 may include pieces of information each indicating the amount of motion. For example, the motion determining signal 226 may include both the sum of absolute differences and the magnitude of the motion vector. In this case, when the above-mentioned sum of absolute differences is less than a predetermined value, or when the magnitude of the motion vector is less than a predetermined value, or in both cases, the determining unit 204 determines that the current frame has no motion.

Further, the super-resolution unit 203 may not include the frame memory 244 and the motion detecting unit 243, and the super-resolution performing unit 242 may perform the resolution up-converting process without using information of temporally different frames. In this case, the motion determining signal 226 may not be outputted.

The super-resolution performing unit 242 performs the resolution up-converting process on the thinned-pixels read and low-resolution image signal 222 by performing the super-resolution process on the low-resolution image signal 222, and outputs the high-resolution image as the super-resolution image signal 233. For instance, the super-resolution performing unit 242 performs the super-resolution process in the same manner as Patent Reference 2. More specifically, the super-resolution performing unit 242 generates the super-resolution image signal 233 by performing the resolution up-converting process on the low-resolution image signal 222 outputted by the imaging unit 202 during the shooting period, using the high-resolution image signal 222 outputted by the imaging unit 202 during a period other than the shooting period. In addition, the super-resolution performing unit 242 refers to the motion information signal 232, and performs the super-resolution process using a current image frame and a temporally preceding or next image frame motioned-compensated by the motion detecting unit 243. In other words, the super-resolution performing unit 242 performs the super-resolution process on a block basis, using blocks of motion-compensated frames.

When the reading scheme indicating signal 221 indicates the all-pixels reading mode, the signal switching unit 241 outputs the image signal 222 as the output image signal 229. Moreover, when the reading scheme indicating signal 221 indicates the thinned-pixels reading mode, the signal switching unit 241 outputs the super-resolution image signal 233 as the output image signal 229.

Figure 13:
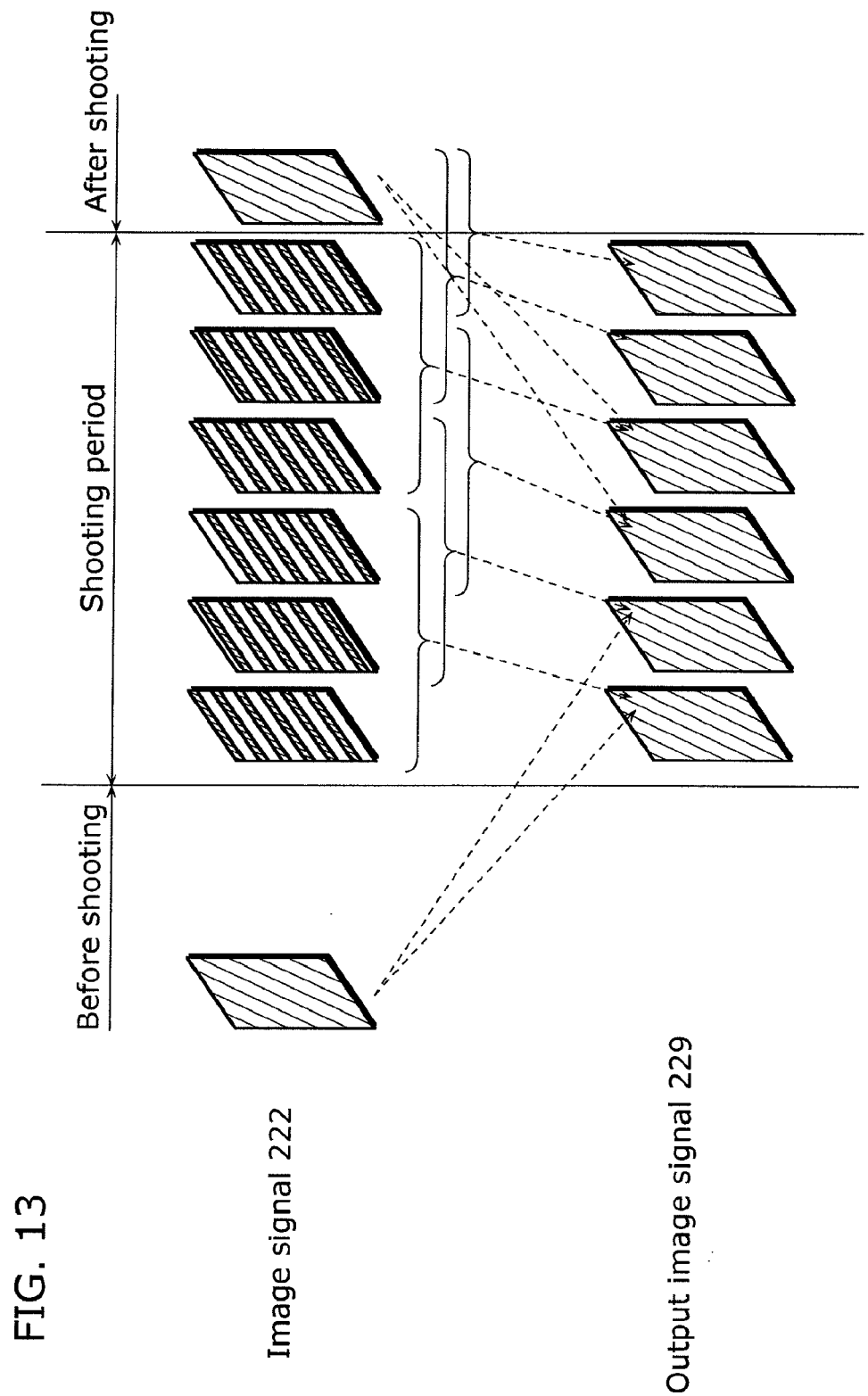
FIG. 13 is a diagram showing a super-resolution process of the image processing device according to Embodiment 1 of the present invention.
Figure 14:
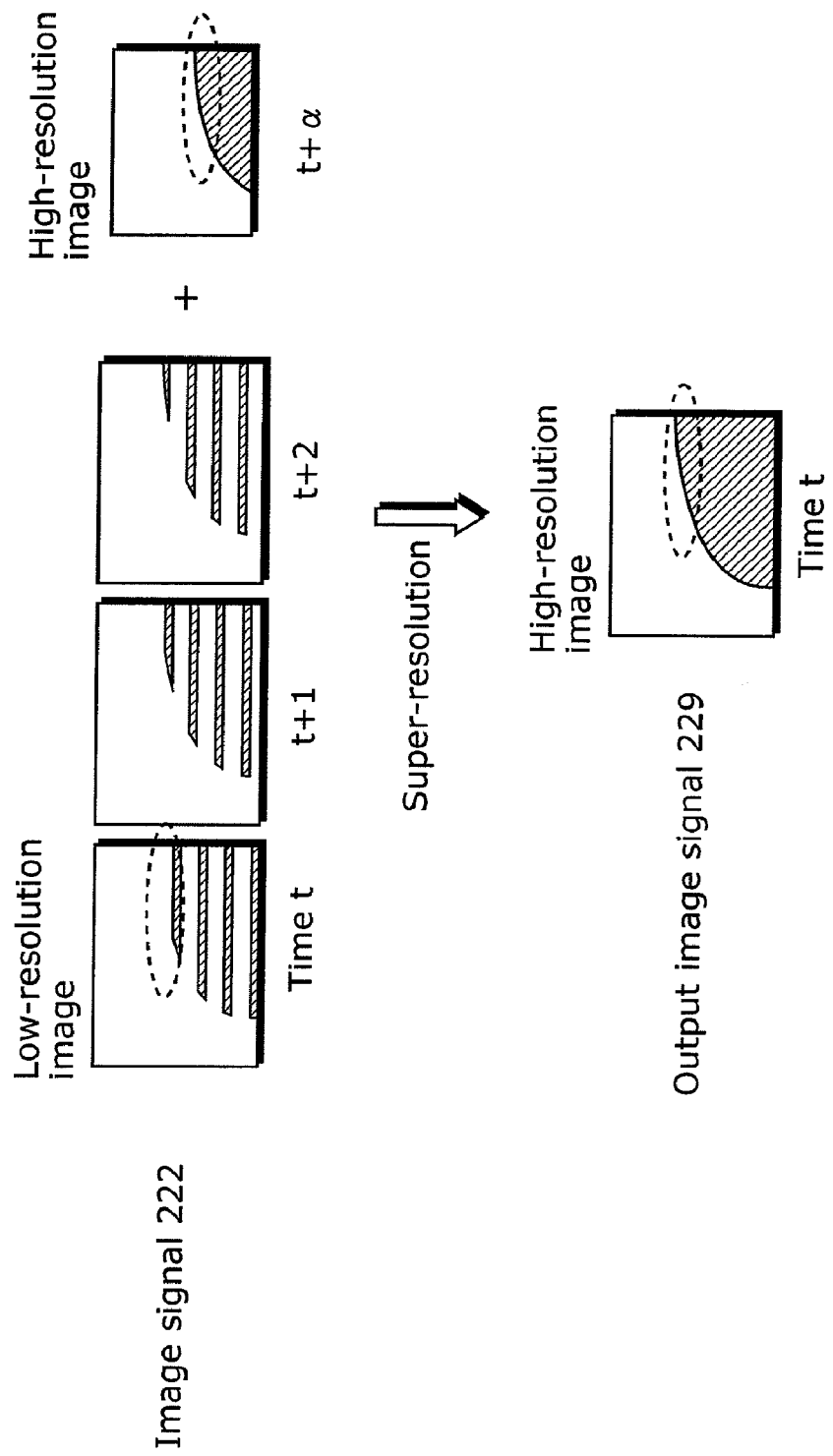
FIG. 14 is a diagram showing the super-resolution process of the image processing device according to Embodiment 1 of the present invention.

FIGS. 13 and 14 each are a diagram showing an example of the super-resolution process of the super-resolution performing unit 242. For example, as shown in FIG. 13, the super-resolution performing unit 242 generates the frame at the given time, which is included in the super-resolution image signal 233, using a frame at the given time which is included in the image signal 222 and two frames subsequent to the frame, that is, temporally continuous three frames included in the image signal 222. Moreover, when a high-resolution frame (frame at the time of reading all the pixels) is not included in the three frames, the super-resolution performing unit 242 generates the frame at the given time included in the super-resolution image signal 233, further using four frames to which the temporally closest high-resolution frame that is shot during a period other than the shooting period is added.

Performing the super-resolution process using the high-resolution image in the above manner makes it possible to, as shown in FIG. 14, accurately restore a signal of pixel positions not included in an original low-resolution frame.

It is to be noted that the number of frames used for the super-resolution process may be two or more than four, and such frames may include high-resolution images.

Furthermore, as shown in FIG. 13, only a signal of a frame for which the super-resolution process is performed on the image signal 222 shot during the shooting period is outputted as the output image signal 229, and the image signal 222 shot during the period other than the shooting period is not outputted as the output image signal 229. Here, the output image signal 229 is, for instance, a signal which is stored into a storage unit and so on included in a digital still camera or outputted to an external device. It is to be noted that after predetermined image processing (contrast compensation, color conversion, image compression, and so on) is performed on the output image signal 229, the output image signal 229 may be stored into the storage unit and so on or outputted to the external device.

Moreover, the super-resolution unit 203 may output image signal 229 including all the frames including frames shot during the period other than the shooting period. In this case, the image processing device 200 first adds, to each frame, tag information indicating whether a frame is a frame shot during the shooting period or a frame shot during the period other than the shooting period, and then outputs the frame to which the tag information is added. This allows a subsequent processing unit included in the digital still camera or another device to easily distinguish an image shot during the shooting period from an image shot during the period other than the shooting period.

Furthermore, in stead of performing the super-resolution process on the image signal 222 immediately, the abovementioned tag information may be added to the image signal 222, and then the image signal 222 may be outputted to the storage unit or the external device and so on. In this case, the external device may perform the super-resolution process using the outputted image signal 222, or the processing unit included in the digital still camera may perform the super-resolution process at any timing (user's instruction or at the time of outputting to the external device and so on).

Figure 15:
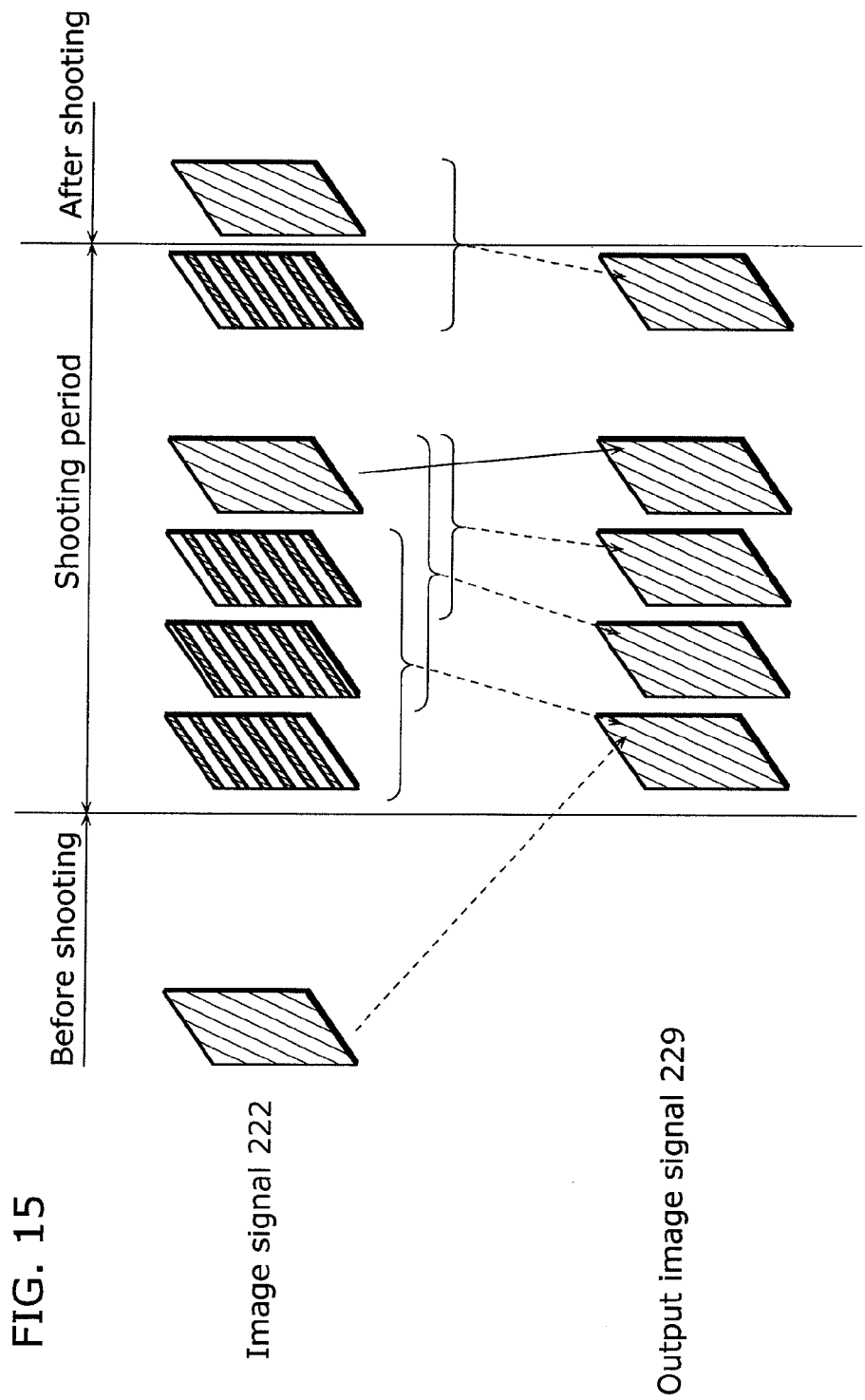
FIG. 15 is a diagram showing a super-resolution process of the image processing device according to Embodiment 1 of the present invention.

FIG. 15 is a diagram showing an example of the super-resolution process of the super-resolution performing unit 242 when a frame has no motion and high-resolution images are shot during the shooting period.

As shown in FIG. 15, the high-resolution image signal 222 shot during the shooting period is directly outputted as the output image signal 229.

Next, a flow of an image processing method of the image processing device 200 will be described.

Figure 16:
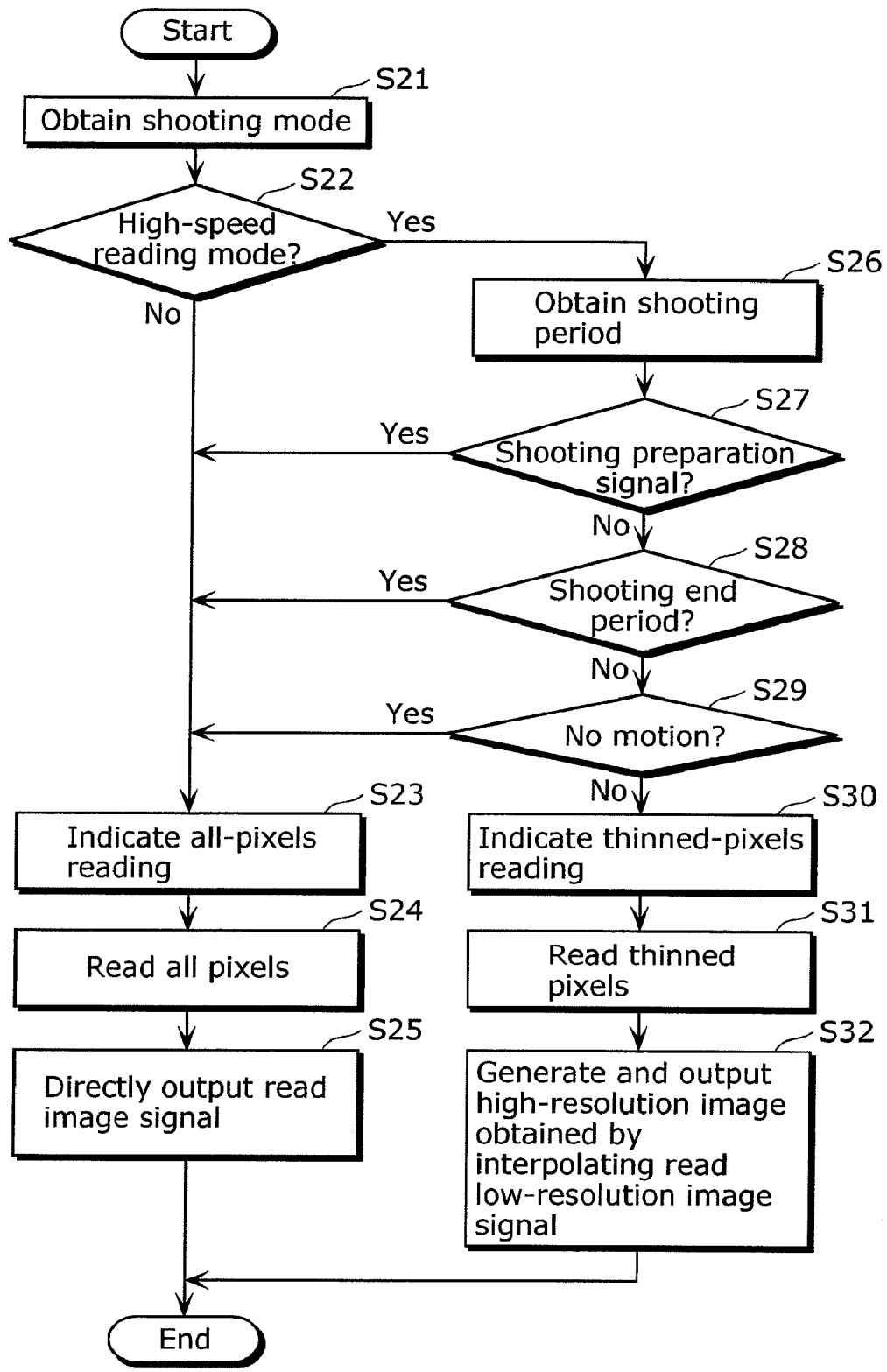
FIG. 16 is a flow chart showing processes of the image processing device according to Embodiment 1 of the present invention.

FIG. 16 is a flow chart showing the image processing method of the image processing device 200.

First, the shooting mode obtaining unit 206 obtains a shooting mode by obtaining the shooting mode signal 220 (Step S21).

Next, the control unit 210 refers to the shooting mode signal 220, and determines whether or not a current shooting mode is a high-speed reading mode (Step S22). When the current shooting mode is the high-speed reading mode (Yes in Step S22), the shooting period obtaining unit 205 obtains a shooting period according to a user's operation (Step S26). Next, the control unit 210 refers to the shooting preparation signal 223, and determines whether or not a time is in a shooting preparation period, that is, whether or not the image processing device 200 is in a state where a start of shooting has not been indicated and the shooting is ready to be started (Step S27).

Moreover, the control unit 210 refers to the shooting end signal 227, and determines whether or not a time is in a shooting end period, that is, a time is at a moment when a state of shooting ends (Step S28).

In addition, the control unit 210 refers to the motion determining signal 226, and determines whether or not a current frame has a motion (Step S29).

When the time is not in the shooting preparation period or the shooting end period and the current frame has the motion (No in Step S27, No in Step S28, and No in Step 29), the control unit 210 indicates a thinned-pixels reading mode to the imaging unit 202 (Step S30). Accordingly, the imaging unit 202 reads a signal corresponding to thinned pixels whose number is smaller than the number of all the pixels including a frame, and outputs the read signal as the image signal 222 (Step S31). Next, the super-resolution unit 203 generates a high-resolution frame using temporally continuous frames included in the thinned-pixels read and low-resolution image signal 222, by performing, for instance, a super-resolution process described in Patent Reference 2, and outputs the output image signal 229 including the generated high-resolution frame (Step S32).

On the other hand, in one of the following cases where the current shooting mode is a regular reading mode (No in Step S22), where the time is in the shooting preparation period (Yes in Step S27), where the time is in the shooting end period (Yes in Step S28), and where the current frame has no motion (No in Step S29), the control unit 210 indicates an all-pixels reading mode to the imaging unit 202 (Step S23). Accordingly, the imaging unit 202 reads a signal corresponding to all the pixels including the frame, and outputs the read signal as the image signal 222 (Step S24). Next, the super-resolution unit 203 directly outputs the all-pixels read image signal 222 as the output image signal 229.

Therefore, in the high-speed reading mode, the image processing device 200 according to Embodiment 1 of the present invention basically causes the imaging unit 202 to operate in the thinned-pixels reading mode, and generates the high-resolution image by performing the super-resolution process on the thinned-pixels read and low-resolution images. As a result, the image processing device 200 achieves high-resolution and high-speed continuous shooting and high-resolution and high-frame rate moving picture shooting.

Further, the image processing device 200 causes the imaging unit 202 to operate in the all-pixels reading mode during a period other than the shooting period (before the shooting period and after the shooting period, and performs the super-resolution process using the all-pixels read and high-resolution frames. Consequently, it is possible to improve the image quality of the high-resolution image that is generated by using the super-resolution process. Moreover, because frames for which the all-pixels reading is performed are frames shot during the period other than the shooting period, even when the all-pixels reading is performed, a frame rate during the shooting period is not lowered. As stated above, the image processing device 200 according to Embodiment 1 of the present invention suppresses the deterioration in image quality in the high-speed reading mode while maintaining a high-frame rate.

Further, when a motion of an object is little, the image processing device 200 performs the all-pixels reading during the shooting period. Although a frame rate is lowered during a period in which the all-pixels reading is performed, it is possible to suppress subjective image degradation such as an unstable motion of an image because an image for which the frame rate is lowered is an image having no motion. On the other hand, performing the all-pixels reading during the shooting period makes it possible to obtain a more high-definition image. Moreover, it is possible to improve image quality of other frames by using the frame at the time of reading all the pixels for the super-resolution process performed on other frames at the time of reading thinned pixels.

It is to be noted that although the imaging unit 202 performs the all-pixels reading during all of the shooting preparation period, the shooting end period, and a period in which there is no motion included in the shooting period, the imaging unit 202 may perform the all-pixels reading during one or more of the periods.

Furthermore, in comparison with a case where the imaging unit 202 is caused to operate in the all-pixels reading mode during the shooting preparation period and a case where the imaging unit 202 is caused to operate in the all-pixels reading mode during the shooting end period, the following advantages can be enumerated in a case where the imaging unit 202 is caused to operate in the all-pixels reading mode during the shooting end period.

First, as shown in FIG. 11, although a time interval between a high-resolution frame shot at the end of the shooting preparation period and a low-resolution frame shot at the beginning of the shooting period becomes Tf, a time interval between a high-resolution frame shot at the beginning of the shooting end period and a low-resolution frame shot at the end of the shooting period becomes Tp. To put it differently, the frame shot during the shooting end period has a shorter temporal distance to the low-resolution frame shot during the shooting period than the frame shot during the shooting preparation period. Accordingly, the image processing device 200 performs the super-resolution process using a temporally closer high-resolution frame, that is, a high-resolution frame having a high correlation. Thus, the image processing device 200 generates an image having higher image quality through the super-resolution process.

Further, when a high-resolution image is shot during the shooting preparation period, a frame rate of an image shot during the shooting preparation period is lowered. For example, assuming cases such as a case where an image shot by the imaging unit 202 is displayed on a monitor and so on and a user performs shooting while looking at the image, an image shot during the shooting preparation period preferably has a high frame rate so that the user performs the shooting at more optimal timing. On the other hand, even when the frame rate is lowered during the shooting end period, the shooting performed by the user remains unaffected by such a bad impact.

Further, although a problem does not arise when the shooting preparation signal 223 is generated based on conventional functions such as pressing halfway the shutter button of the digital still camera, a function for specifying the shooting preparation period needs adding when the shooting is started according to an operation with a button not having a function for determining pressing halfway, a touch panel, or the like. On the other hand, it is possible to easily derive the shooting end period from the shooting period. Stated differently, it is possible to easily realize control for switching to the all-pixels reading mode during the shooting end period in many imaging devices.

Moreover, as described above, it is more preferable to shoot the high-resolution images during both the shooting preparation period and the shooting end period, and to perform the super-resolution process using the high-resolution images. For instance, as shown in FIG. 13, the image processing device 200 performs, on a frame shot in the first half of the shooting period, the super-resolution process using the high-resolution frame shot during the shooting preparation period, and performs, on a frame shot in the latter half of the shooting period, the super-resolution process using the high-resolution frame shot during the shooting end period. In other words, the image processing device 200 performs the resolution up-converting process using the temporally closer high-resolution frames. Thus, the image processing device 200 generates the image having the higher image quality through the super-resolution process.

Furthermore, although the high-resolution frame shot during the shooting preparation period is a frame shot immediately before (before time Tf) a start of the shooting period in the above description, a high-resolution frame may be shot at any timing other than immediately before the start of the shooting period as long as the timing is before the start of the shooting period. However, in consideration of a correlation with a frame shot during the shooting period, it is preferable to shoot a high-resolution frame at a time closer to a start time of the shooting period.

Likewise, although the high-resolution frame shot during the shooting end period is a frame immediately after (after time Tp) an end of the shooting period in the above description, a high-resolution frame may be shot at any timing other than immediately after the end of the shooting period as long as the timing is after the end of the shooting period. However, in consideration of a correlation with a frame shot during the shooting period, it is preferable to shoot a high-resolution frame at a time closer to the end time of the shooting period.

Embodiment 2

In addition to the functions of the above-described image processing device 200 according to Embodiment 1 of the present invention, an image processing device 300 according to Embodiment 2 of the present invention further switches an imaging method between thinned-pixels reading and all-pixels reading depending on whether or not a monitor display is performed. In addition, the image processing device 300 according to Embodiment 2 of the present invention performs a super-resolution process using the temporally closest high-resolution frame.

Figure 17:
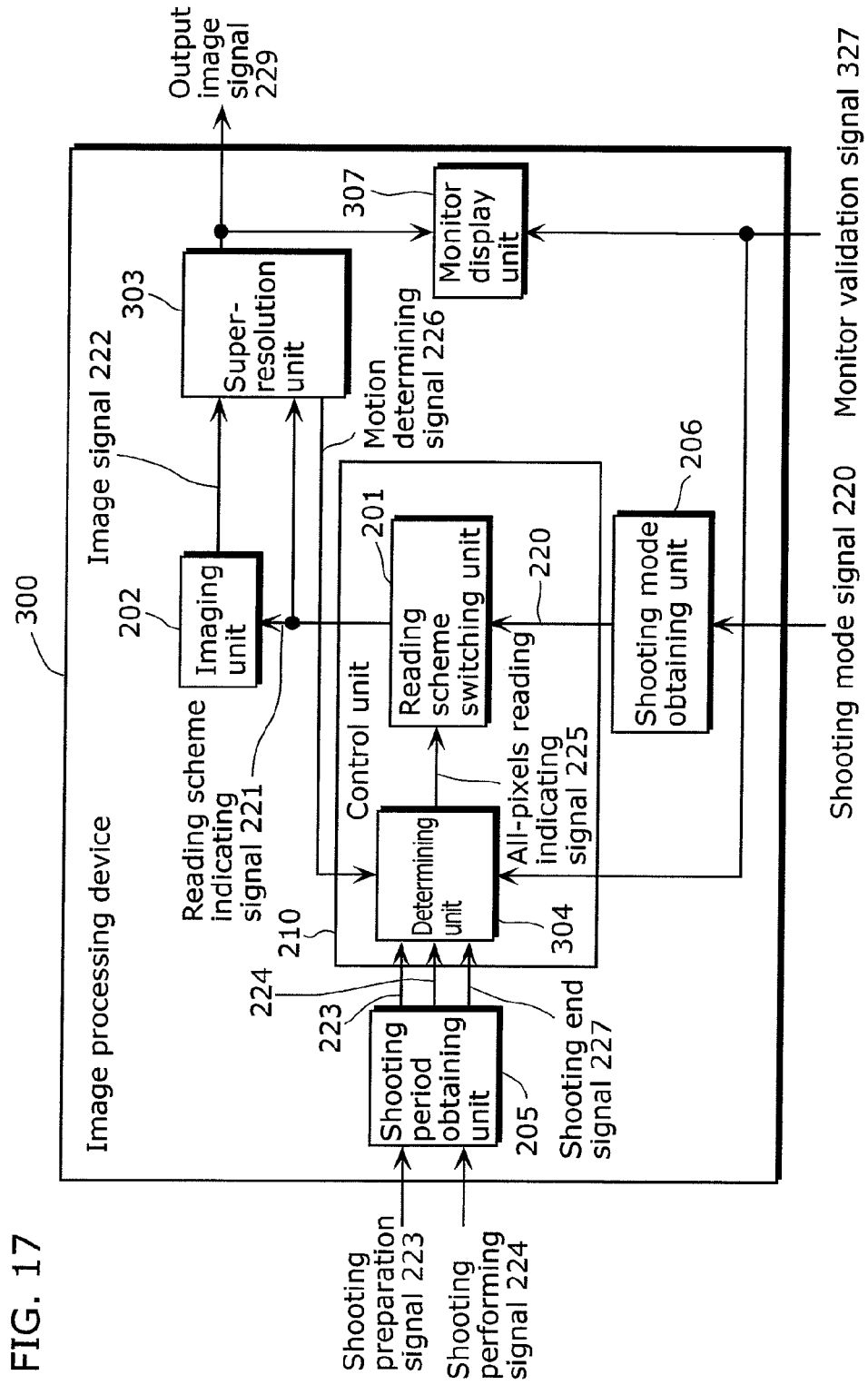
FIG. 17 is a block diagram showing an image processing device according to Embodiment 2 of the present invention.

FIG. 17 is a block diagram showing a structure of the image processing device 300 according to Embodiment 2 of the present invention. It is to be noted that the same numerals are given to the same components as FIG. 8, and descriptions overlapping with Embodiment 1 are not described.

In addition to the structure of the image processing device 200 shown in FIG. 8, the image processing device 300 further includes a monitor display unit 307. Moreover, structures of a determining unit 304 and a super-resolution unit 303 are different from Embodiment 1.

The monitor display unit 307 receives a monitor validation signal 327 and an output image signal 229 as inputs, and displays an image of the output image signal 229. More specifically, when the monitor validation signal 327 indicates that a monitor display is to be performed, the monitor display unit 307 displays on a monitor the image of the output image signal 229 using a display device such as a liquid-crystal display or an organic EL display. In addition, when the monitor validation signal 327 indicates that the monitor display is not to be performed, the monitor display unit 307 does not display on the monitor the image of the output image signal 229. It is to be noted that when the monitor validation signal 327 indicates that the monitor display is not to be performed, the monitor display unit 307 may display an image of a signal other than the output image signal 229 and information, for example, shooting conditions such as an ISO sensitivity, an aperture having F-number, and a shutter speed.

The monitor validation signal 327 is a signal based on a user's operation, and is a signal indicating whether or not the monitor display is to be performed. More specifically, when the user has set a monitor display mode, for instance, when the user performs shooting while looking at an image displayed on the monitor, the monitor validation signal 327 indicates that the monitor display is to be performed. In addition, when the user has set a monitor no-display mode, for example, when the user performs the shooting while looking at an object through an optical viewfinder, the monitor validation signal 327 indicates that the monitor display is not to be performed.

The determining unit 304 receives a shooting performing signal 224, a shooting preparation signal 223, a motion determining signal 226, and the monitor validation signal 327 as inputs, and outputs an all-pixels reading indicating signal 225. To put it differently, in addition to the functions of Embodiment 1, the determining unit 304 further outputs the all-pixels reading indicating signal 225 according to the monitor validation signal 327. More specifically, even in the case of a shooting preparation period or when a motion of the object is not detected during a shooting period, when the monitor display is performed, the determining unit 304 does not output the all-pixels reading indicating signal 225 indicating all-pixels reading.

Stated differently, in the cases where the monitor validation signal 327 indicates that the monitor display is not to be performed, where the shooting performing signal 224 does not indicate the shooting period, and where the shooting preparation signal 223 indicates the shooting preparation period, the determining unit 304 outputs the all-pixels reading indicating signal 225 indicating the all-pixels reading. Moreover, when the shooting performing signal 224 indicates the shooting end period, the determining unit 304 outputs the all-pixels reading indicating signal 225 indicating the all-pixels reading. Further, in the cases where the monitor validation signal 327 indicates that the monitor display is not to be performed and where the motion determining signal 226 indicates that a current frame has no motion, the determining unit 304 outputs the all-pixels reading indicating signal 225 indicating the all-pixels reading.

Moreover, in cases other than the above, that is, in the cases where the monitor validation signal 327 indicates that the monitor display is to be performed, the shooting performing signal 224 does not indicate the shooting period, and the shooting preparation signal 223 indicates the shooting preparation period, where the shooting performing signal 224 indicates the shooting period and the motion determining signal 226 indicates that the current frame has the motion, and where the shooting performing signal 224 indicates the shooting period, the monitor validation signal 327 indicates that the monitor display is to be performed, and the motion determining signal 226 indicates that the current frame has no motion, the determining unit 304 outputs the all-pixels reading indicating signal 225 indicating thinned-pixels reading.

It is to be noted that the determining unit 304 may not receive the motion determining signal 226 as an input, and may not control the all-pixels reading indicating signal 225 according to a motion. Further, the determining unit 304 may periodically output the all-pixels reading indicating signal 225 indicating the all-pixels reading.

Next, a flow of an image processing method of the image processing device 300 will be described.

Figure 18:
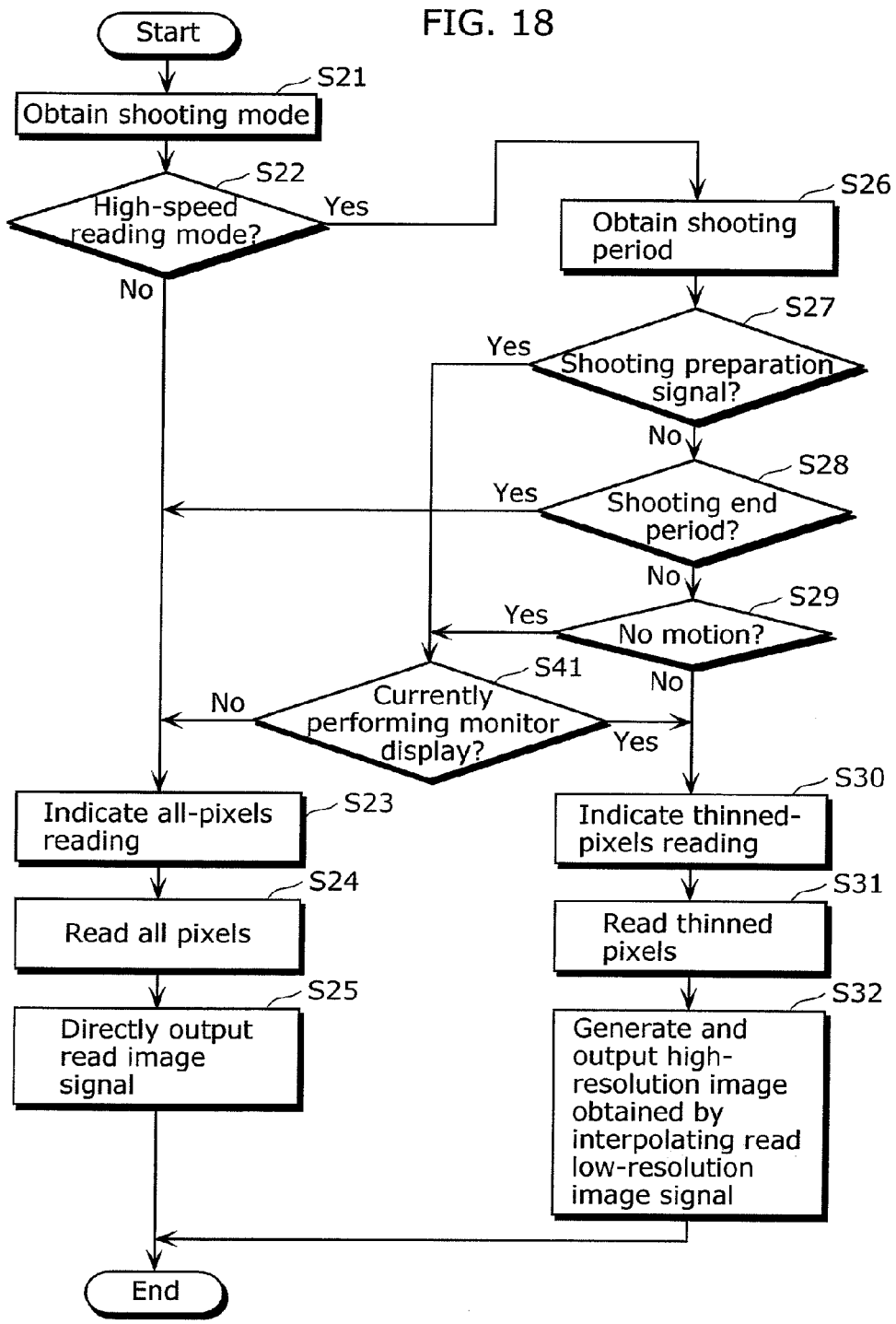
FIG. 18 is a flow chart showing processes of the image processing device according to Embodiment 2 of the present invention.

FIG. 18 is a flow chart showing the image processing method of the image processing device 300. It is to be noted that the same processes as the image processing method of the image processing device 200 according to Embodiment 1 shown in FIG. 16 are not described.

The image processing method of the image processing device 300 differs from that of the image processing device 200 according to Embodiment 1 in operations in a high-speed reading mode (Yes in Step S22) in the case of the shooting preparation period (Yes in Step S27) and when a current frame has no motion (No in Step S29).

More specifically, in the case of the shooting preparation period (Yes in Step S27) and when the current frame has no motion (No in Step S29), the determining unit 304 refers to the monitor validation signal 327, and determines whether or not the monitor display unit 307 is displaying on the monitor the image of the output image signal 229 (Step S41).

When the monitor display unit 307 is displaying on the monitor the image of the output image signal 229 (Yes in Step S41), the control unit 210 indicates a thinned-pixels reading mode to the imaging unit 202 (Step S30). Accordingly, the imaging unit 202 reads a signal corresponding to thinned pixels whose number is smaller than the number of all the pixels including a frame, and outputs the read signal as the image signal 222 (Step S31). Next, the super-resolution unit 203 generates a high-resolution frame using temporally continuous frames included in the thinned-pixels read and low-resolution image signal 222, by performing, for instance, a super-resolution process described in Patent Reference 2, and outputs the output image signal 229 including the generated high-resolution frame (Step S32).

On the other hand, when the monitor display unit 307 is not displaying on the monitor the image of the output image signal 229 (No in Step S41), the control unit 210 indicates an all-pixels reading mode to the imaging unit 202 (Step S23). Accordingly, the imaging unit 202 reads a signal corresponding to all the pixels including the frame, and outputs the read signal as the image signal 222 (Step S24). Next, the super-resolution unit 203 directly outputs the all-pixels read image signal 222 as the output image signal 229.

Next, a structure and operations of the super-resolution unit 303 will be described.

Figure 19:
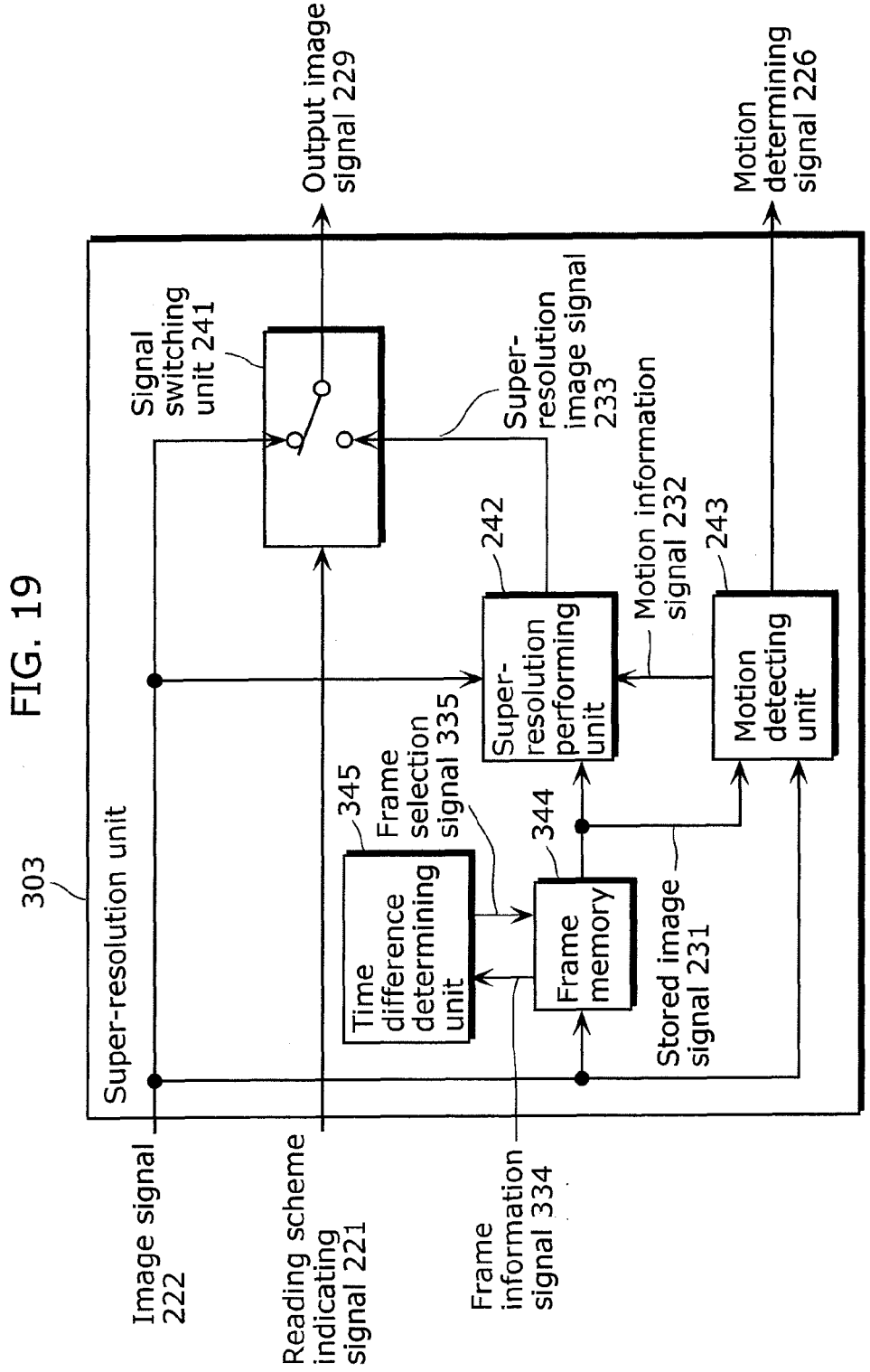
FIG. 19 is a block diagram showing a super-resolution unit according to Embodiment 2 of the present invention.

FIG. 19 is a block diagram showing the structure of the super-resolution unit 303. It is to be noted that the same numerals are given to the same components as FIG. 12, and descriptions overlapped with Embodiment 1 are not described.

In addition to the structure of the super-resolution unit 203 shown in FIG. 12, the super-resolution unit 303 shown in FIG. 19 further includes a time difference determining unit 345. In addition, a structure of a frame memory 344 differs.

A frame at the time of reading all the pixels or thinned pixels which is included in the image signal 222 is temporarily stored into the frame memory 344. In addition, the frame memory 344 outputs a frame information signal 334 and a stored image signal 231.

The frame information signal 334 includes times of frames stored in the frame memory 344 and information indicating whether each frame is a frame at the time of reading all the pixels (hereinafter, all-pixels read frame) or a frame at the time of reading thinned pixels (hereinafter, thinned-pixels read frame). The stored image signal 231 includes the thinned-pixels read frame stored in the frame memory 344 and the all-pixels read frame selected with a frame selection signal 335.

The time difference determining unit 345 determines, based on the frame information signal 334, a frame that is the all-pixels read frame and is the closest to a time of a current frame. In addition, the time difference determining unit 345 outputs the frame selection signal 335 specifying the frame that is the all-pixels read frame and is the closest to the time of the current frame.

The motion detecting unit 243 detects a motion between a current frame included in the image signal 222 and a previously stored frame included in the stored image signal 231, and outputs the motion information signal 232 indicating an amount of motion of one or more objects within the current frame and the motion determining signal 226 indicating whether or not the current frame has a motion.

Figure 20:
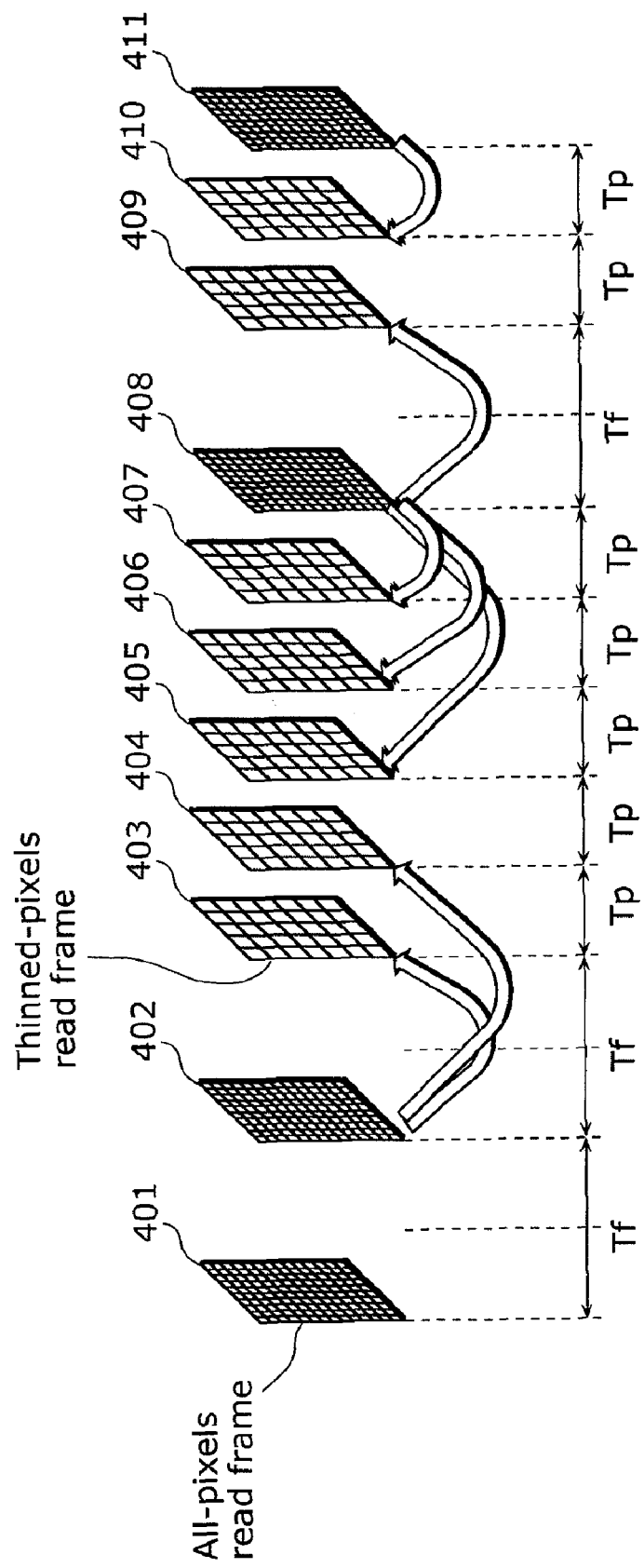
FIG. 20 is a diagram showing a super-resolution process of the image processing device according to Embodiment 2 of the present invention.

FIG. 20 is a diagram showing an example of frames used for the super-resolution process of a super-resolution performing unit 242. Here, FIG. 20 shows an example of Tf=2× Tp, where an imaging interval of the all-pixels read frame is Tf and an imaging interval of a thinned-pixels read frame is Tp.

In the case of performing a resolution up-converting process on a frame 403 shown in FIG. 20, an all-pixels read frame which is the temporally closest to the frame 403 is a frame 402. For this reason, the time difference determining unit 345 outputs the frame selection signal 335 specifying the frame 402. Accordingly, the super-resolution performing unit 242 performs the resolution up-converting process on the frame 403 using the frame 402. It is to be noted that the super-resolution performing unit 242 may further use a frame other than the frame 402, and use, for instance, a frame 404 that is not an all-pixels read frame but is the temporally closest thinned-pixels read frame.

Moreover, in the case of performing the resolution up-converting process on a frame 405, an all-pixels read frame which is the temporally closest to the frame 405 is a frame 408. For this reason, the time difference determining unit 345 outputs the frame selection signal 335 specifying the frame 408. Accordingly, the super-resolution performing unit 242 performs the resolution up-converting process on the frame 405 using the frame 408. It is to be noted that the super-resolution performing unit 242 may further use a frame other than the frame 408, and use, for example, at least one of the frame 404 and a frame 406, both of which are not an all-pixels read frame but are the temporally closest thinned-pixels read frame.

Furthermore, in the case of performing the resolution up-converting process on a frame 409, an all-pixels read frame which is the temporally closest to the frame 409 is a frame 408 and a frame 411. For this reason, the time difference determining unit 345 outputs the frame selection signal 335 specifying either the frame 408 or the frame 411. For this reason, the super-resolution performing unit 242 performs the resolution up-converting process on the frame 409 using either the frame 408 or the frame 411 specified with the frame selection signal 335. It is to be noted that in the example shown in FIG. 20, the frame 408 is used in performing the resolution up-converting process on the frame 409. It is to be noted that the super-resolution performing unit 242 may further use a frame other than the frame 408, and use, for instance, a frame 410 that is not an all-pixels read frame but is the temporally closest thinned-pixels read frame.

Here, a correlation between frames is generally higher when the frames are temporally close to each other. Thus, the super-resolution performing unit 242 accurately estimates, with information of an all-pixels read frame, image information lost through thinned-pixels reading in a current frame, by using a temporally closer all-pixels read frame for the resolution up-converting process. Accordingly, the image processing device 300 according to Embodiment 2 of the present invention obtains an image having higher image quality through the super-resolution process.

It is to be noted that the super-resolution performing unit 242 according to Embodiments 1 and 2 may employ a technique called reconstructing super-resolution described in Patent Reference 2 or a technique called learning super-resolution in which an all-pixels read frame is shown as learning data and which is shown in Japanese Unexamined Patent Application Publication No. 2005-253000 (Patent Reference 3). Further, instead of performing the resolution up-converting process, the super-resolution performing unit 242 may perform image processing in which dynamic range expansion as described in, for instance, Japanese Patent No. 3458741 (Patent Reference 4), is preformed using a temporally close frame in a similar manner. In this case, in the above description, the thinned-pixels read frame may be replaced with a frame having a short exposure time, and the all-pixels read frame may be replaced with a frame having a long exposure time.

As described above, the image processing device 300 according to Embodiment 2 of the present invention suppresses a deterioration in image quality in the high-speed reading mode while maintaining a high frame rate, as with the image processing device 200 according to Embodiment 1.

Further, in the case of currently performing a monitor display, the image processing device 300 does not perform the all-pixels reading even in a state of shooting preparation. This makes it possible to start shooting smoothly without lowering a frame rate on the monitor display before a start of the shooting.

In addition, the image processing device 300 performs the super-resolution process using the all-pixels read frame that is the temporally closest to a current frame. Thus, the image processing device 300 generates the image having the higher image quality through the super-resolution process.

It is to be noted that although, in the above description, control is further performed depending on presence of the above monitor display in the case of the shooting preparation period and when a motion is not detected in an image during the shooting period, the control may be performed depending on the presence of the monitor display only either in the case of the shooting preparation period or when the motion is not detected in the image during the shooting period. In addition, the control may be performed depending on the presence of the monitor display during the shooting end period.

Embodiment 3

Embodiment 3 of the present invention will describe an example of causing an independent computer system to execute the processes described in each of the above-mentioned embodiments by recording, on a recording medium such as a flexible disk, a program for realizing the structure of the image processing device 200 or 300 described in a corresponding one of the embodiments.

Figure 21A:
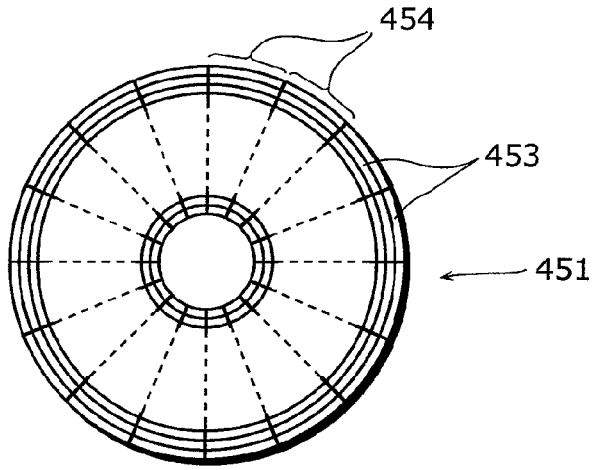
FIG. 21A is a diagram showing a structure of a recording medium according to Embodiment 3 of the present invention.
Figure 21B:
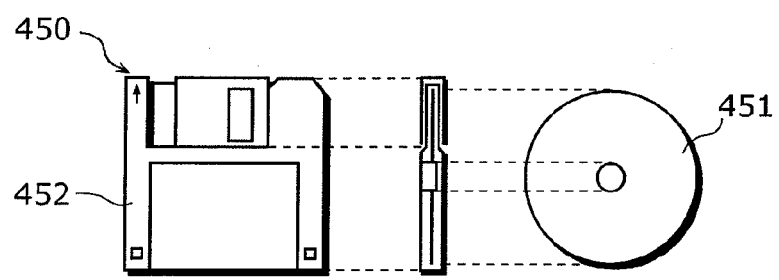
FIG. 21B is a diagram showing a structure of the recording medium according to Embodiment 3 of the present invention.
Figure 21C:
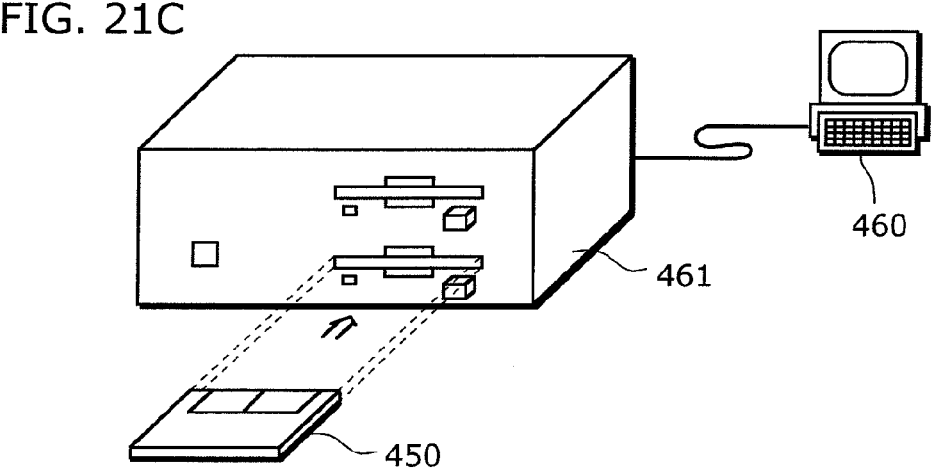
FIG. 21C is a diagram showing a structure of a computer system according to Embodiment 3 of the present invention.

FIGS. 21A to 21C each are a schematic diagram showing a case where a computer system implements the image processing device described in each embodiment, using a program recorded on a recording medium such as a flexible disk.

FIG. 21A is a diagram showing an example of a physical format of the flexible disk that is the recording medium. FIG. 21B is a diagram showing an external view of a flexible disk 450 viewed from the front, a cross section structure of the flexible disk 450, and a disk 451.

The flexible disk 450 includes a case 452 and the disk 451 included in the case 452. Tracks 453 are concentrically formed on the surface of the disk 451 from an outer circumference to an inner circumference. Each track 453 is divided into sixteen sectors 454 in angular direction. The above-mentioned program is recorded on regions assigned on the disk 451.

Furthermore, FIG. 21C is a diagram showing a structure of a computer system 460 which records the program on the flexible disk 450, reads the program from the flexible disk 450, and executes the read program. When the program for realizing the image processing device 200 or 300 is recorded on the flexible disk 450, the computer system 460 writes the program into the flexible disk 450 via a flexible disk drive 461.

Moreover, when functions of the image processing device 200 or 300 are built into the computer system 460 by executing the program in the flexible disk 450, the flexible disk drive 461 reads the program from the flexible disk 450 and transfers the read program to the computer system 460. The computer system 460 realizes the above-mentioned functions of the image processing device 200 or 300 by executing the transferred program.

It is to be noted that the flexible disk 450 has been described as the recording medium in the example in the above description, an optical disk can be used in the same manner. Furthermore, the recording medium is not limited to the above, anything which records a program, such as an IC card and a ROM cassette, can be used in the same manner. Moreover, the recording medium is not limited to a recording medium removable from the computer system 460, and the computer system 460 may execute a program recorded on an HDD (hard disk drive), a nonvolatile memory, a RAM, or a ROM included therein. Further, the computer system 460 may execute a program obtained via a wired or wireless communication network.

Embodiment 4

Embodiment 4 of the present invention will describe a digital camera including the image processing device 200 according to Embodiment 1 or the image processing device 300 according to Embodiment 2.

Figure 22A:
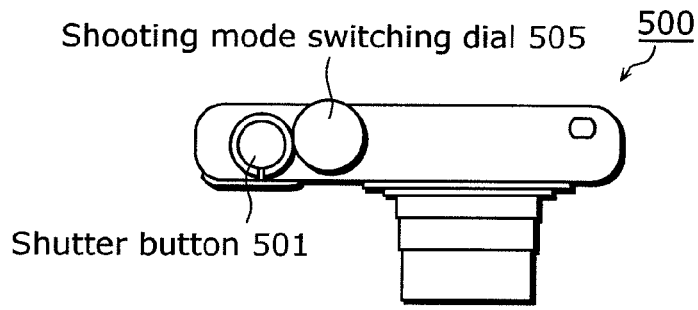
FIG. 22A is a diagram showing an external view of a digital camera according to Embodiment 4 of the present invention.
Figure 22B:
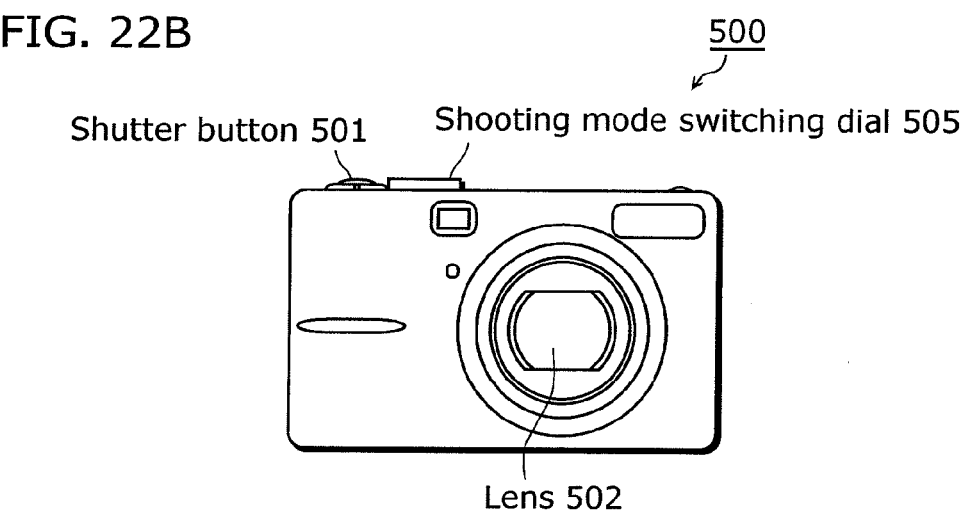
FIG. 22B is a diagram showing the external view of the digital camera according to Embodiment 4 of the present invention.
Figure 22C:
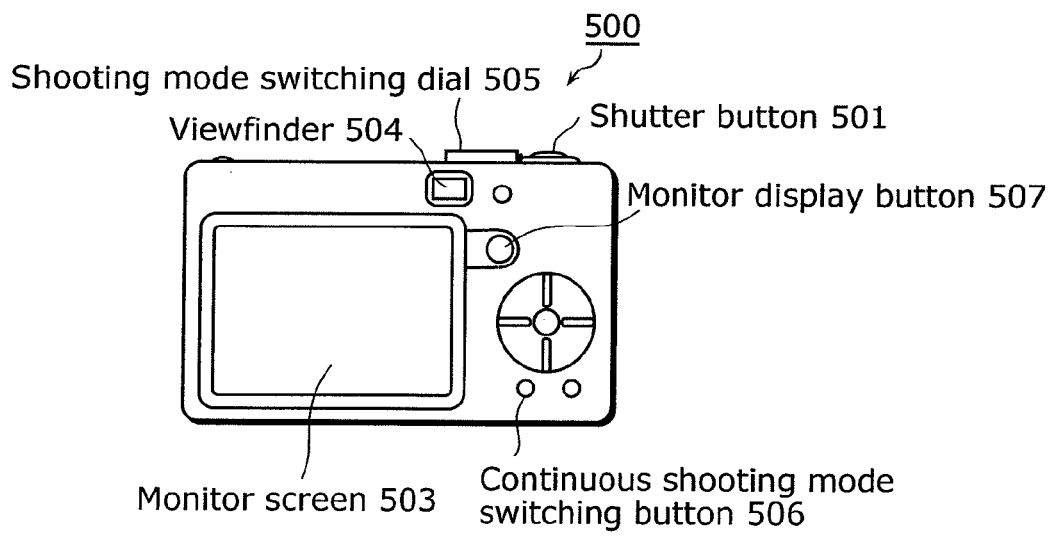
FIG. 22C is a diagram showing the external view of the digital camera according to Embodiment 4 of the present invention.

FIGS. 22A to 22C are external views of a digital camera 500 according to Embodiment 4 of the present invention. FIGS. 22A to 22C each are a diagram showing the digital camera 500 viewed from the above, the front, or the behind.

The digital camera 500 is, for instance, a digital still camera having a function to shoot a still image and a function to shoot a moving picture. The digital camera 500 includes a shutter button 501, a lens 502, a monitor screen 503, a viewfinder 504, a shooting mode switching dial 505, a continuous shooting mode switching button 506, and a monitor display button 507.

The lens 502 focuses light on an imaging unit 202. The light passing through the lens 502 is photoelectrically converted and outputted as the image signal 222 by the imaging unit 202. Here, the imaging unit 202 is, for example, the imaging unit 202 described in each of the above embodiments.

When a user presses the shutter button 501 halfway, a focus is adjusted by operating the lens 502. Moreover, when the user presses the shutter button 501 halfway, a shooting preparation signal 223 indicating a shooting preparation period is generated. In describing the example shown in FIG. 11, when the shutter button 501 is pressed halfway, the shooting preparation signal 223 is set to indicate value 1.

Rotation of the shooting mode switching dial 505 by the user switches a shooting mode. Here, the shooting mode includes, for instance, a moving picture shooting mode, a still image shooting mode, and an image reproducing mode.

Every time the user presses the continuous shooting mode switching button 506, the shooting mode is switched. For example, in the still image shooting mode, every time the continuous shooting mode switching button 506 is pressed, the shooting mode is switched from a regular shooting mode, a high-speed continuous shooting mode, and a low-speed continuous shooting mode in this order. Here, the regular shooting mode is a mode for shooting a still image when the user presses the shutter button 501. Furthermore, the high-speed continuous shooting mode is a mode for shooting 8 still images per second and so on while the user is pressing the shutter button 501. Moreover, the high-speed continuous shooting mode is a mode for shooting 2 still images per second and so on while the user is pressing the shutter button 501.

For instance, when the high-speed continuous shooting mode is set with the continuous shooting mode switching button 506, a shooting mode signal 220 indicating the high-speed reading mode is generated. Furthermore, when the regular shooting mode or the low-speed continuous shooting mode is set, a shooting mode signal 220 indicating the regular reading mode is generated.

Moreover, in the moving picture shooting mode, every time the user presses the continuous shooting mode switching button 506, a high-frame rate moving picture shooting mode and a low-frame rate moving picture shooting mode are switched between each other. For example, the high-frame rate moving picture shooting mode is a mode for shooting 120 moving pictures per second and so on while the shutter button 501 is being pressed. Furthermore, the low-frame rate moving picture shooting mode is a mode for shooting 30 moving pictures per second and so on.

For instance, when the high-frame rate moving picture shooting mode is set with the continuous shooting mode switching button 506, the shooting mode signal 220 indicating the high-speed reading mode is generated. Moreover, when the low-frame rate moving picture shooting mode is set, the shooting mode signal 220 indicating the regular reading mode is generated.

The monitor screen 503 is, for example, the monitor display unit 307 described in Embodiment 2, and displays on a monitor an output image signal 229 using a display device such as a liquid-crystal display and an organic EL display.

Every time the user presses the monitor display button 507, a value of the monitor validation signal 327 described in Embodiment 2 is switched between "monitor display is to be performed" and "monitor display is not to be performed". When a monitor validation signal 327 indicating that the monitor display is not to be performed is outputted, the monitor screen 503 does not display on the monitor the output image signal 229. In this case, the user checks an object to be shot, using the viewfinder 504. Furthermore, when a monitor validation signal 327 indicating that the monitor display is to be performed, the monitor screen 503 displays on the monitor the output image signal 229.

The viewfinder 504 is an optical viewfinder which directly shows an optical image without performing photoelectric conversion.

It is to be noted that a shooting mode switching method and a shooting operation method in each shooting mode may be methods other than the above methods. For example, in the shooting operation method in a moving picture mode or a continuous shooting mode, moving picture shooting or continuous shooting may be started by pressing the shutter button 501 once, and may be ended by pressing the shutter button 501 again. Moreover, the above operation may be performed with anything other than the shutter button 501. Furthermore, even when anything other than the shutter button 501 is used for an operation to start the moving picture shooting or the continuous shooting, as with the shutter button 501, the shooting preparation signal 223 is generated by detecting the pressing halfway.

Moreover, the image processing device 200 or 300 according to the present invention may be applied to a digital video camera.

(Other Modifications)

It is to be noted that although the present invention has been described based on the above-mentioned embodiments, the present invention is not surely limited to the embodiments. The present invention includes the following cases.

(1) Each of the above devices may be specifically a computer system including a micro processing unit, a ROM, a RAM, a hard disk unit, a display unit, a keyboard, a mouse, and the like. A computer program is stored in the RAM or the hard disk unit. The micro processing unit operates according to the computer program, so that each of the devices fulfills a function. Here, in order to fulfill predetermined functions, the computer program is programmed by combining plural instruction codes each of which indicates an instruction for a computer.

(2) Part or all of the components included in each of the above devices may be included in one system large scale integration (LSI). The system LSI is a super-multifunctional LSI manufactured by integrating components on one chip and is, specifically, a computer system including a micro processing unit, a ROM, a RAM, and the like. The computer program is stored in the RAM. The micro processing unit operates according to the computer program, so that the system LSI fulfills its function.

(3) Part or all of the components included in each of the above devices may be included in an IC card removable from each of the devices or in a stand alone module. The IC card or the module is a computer system including a micro processing unit, a ROM, a RAM, and the like. The IC card or the module may include the above super-multifunctional LSI. The micro processing unit operates according to the computer program, so that the IC card or the module fulfills its function. The IC card or the module may have tamper-resistance.

(4) The present invention may be any of the above methods. Furthermore, the present invention may be a computer program which causes a computer to execute these methods, and a digital signal which is composed of the computer program.

Moreover, in the present invention, the computer program or the digital signal may be recorded on a computer-readable recording medium such as a flexible disk, a hard disk, a CD-ROM, an MO, a DVD, a DVD-ROM, a DVD-RAM, a Blu-ray Disc, and a semiconductor memory. In addition, the digital signal may be recorded on these recording media.

Furthermore, in the present invention, the computer program or the digital signal may be transmitted via an electronic communication line, a wireless or wired communication line, a network represented by the Internet, data broadcasting, and the like.

Moreover, the present invention may be a computer system including a micro processing unit and a memory. The memory may store the above computer program, and the micro processing unit may operate according to the computer program.

Furthermore, the present invention may execute the computer program or the digital signal in another independent computer system by recording the computer program or the digital signal on the recording medium and transmitting the recorded computer program or digital signal or by transmitting the computer program or the digital signal via the network and the like.

(5) The above embodiments and the above modifications may be combined respectively.

INDUSTRIAL APPLICABILITY

The present invention is applicable to image processing devices, image processing methods, and programs, and particularly to a digital still camera, a digital video camera, and so on including a mode for high-speed image reading such as high-speed continuous shooting and high-frame rate shooting.

The invention claimed is:

1. An image processing device comprising:
a shooting period obtaining unit configured to obtain a shooting period;
an imaging unit which includes a plurality of pixels each converting light into an electrical signal, and which has a first mode in which a low-resolution image signal is outputted and a second mode in which a high-resolution image signal is outputted, the low-resolution image signal including electrical signals converted by a first number of pixels among the plurality of pixels, the high-resolution image signal including electrical signals converted by a second number of pixels among the plurality of pixels, and the second number being greater than the first number;
a control unit configured to cause said imaging unit to operate in the first mode during the shooting period obtained by said shooting period obtaining unit, and to operate in the second mode during a period other than the shooting period; and
a super-resolution unit configured to generate a super-resolution image signal by performing a resolution up-converting process on the low-resolution image signal outputted by said imaging unit during the shooting period using the high-resolution image signal outputted by said imaging unit during the period other than the shooting period,
wherein said control unit is configured to cause said imaging unit to operate in the second mode before a start of the shooting period or after an end of the shooting period, and
wherein said super-resolution unit is configured to perform the resolution up-converting process on the low-resolution image signal outputted by said imaging unit during the shooting period using (i) the high-resolution image signal outputted by said imaging unit before the start of the shooting period when said control unit causes said imaging unit to operate in the second mode before the start of the shooting period or (ii) the high-resolution image signal outputted by said imaging unit after the end of the shooting period when said control unit causes said imaging unit to operate in the second mode after the end of the shooting period.

2. The image processing device according to claim 1, wherein said control unit is configured to cause said imaging unit to operate in the second mode before a start of the shooting period, and
wherein said super-resolution unit is configured to perform the resolution up-converting process on the low-resolution image signal outputted by said imaging unit during the shooting period using the high-resolution image signal outputted by said imaging unit before the start of the shooting period.

3. The image processing device according to claim 2, further comprising
a monitor display unit configured to display, on a monitor, an image represented by the low-resolution image signal, an image represented by the high-resolution image signal, or an image represented by the super-resolution image signal,
wherein said control unit is configured to cause said imaging unit to operate in the second mode before the start of the shooting period when said monitor display unit does not display, on the monitor, the image represented by the low-resolution image signal, the image represented by the high-resolution image signal, or the image represented by the super-resolution image signal, and to operate in the first mode before the start of the shooting period when said monitor display unit displays, on the monitor, the image represented by the low-resolution image signal, the image represented by the high-resolution image signal, or the image represented by the super-resolution image signal.

4. The image processing device according to claim 2,
wherein said shooting period obtaining unit is configured to obtain a shooting preparation signal indicating whether or not a shutter button is pressed halfway, and
wherein said control unit is configured to cause said imaging unit to operate in the second mode when the shooting preparation signal indicates that the shutter button is pressed halfway.

5. The image processing device according to claim 1,
wherein said control unit is further configured to cause said imaging unit to operate in the second mode during the shooting period when an amount of a motion in an image represented by the low-resolution image signal is smaller than a predetermined value, and
wherein said super-resolution unit is further configured to perform the resolution up-converting process on the low-resolution image signal outputted by said imaging unit during the shooting period using the high-resolution image signal outputted by said imaging unit during the shooting period.

6. The image processing device according to claim 5,
wherein said control unit is configured to determine that the amount of the motion in the image represented by the low-resolution image signal is smaller than the predetermined value when a sum of absolute differences in each of pixel values between a temporally preceding or next image frame and a current image frame, both of which are included in the image represented by the low-resolution image signal, is smaller than a predetermined value.

7. The image processing device according to claim 5,
wherein said super-resolution unit is configured to motion-compensate between a temporally preceding or next image frame and a current image frame, both of which are included in the image represented by the low-resolution image signal, and to perform the resolution up-converting process on the low-resolution image signal outputted by said imaging unit during the shooting period using the temporally preceding or next image frame and the current image frame that are motion-compensated, and
wherein said control unit is configured to determine that the amount of the motion in the image represented by the low-resolution image signal is smaller than the predetermined value when a sum of absolute differences in each of pixel values between the temporally preceding or next image frame and the current image frame that are motion-compensated is smaller than a predetermined value when a magnitude of a motion vector indicating an amount of a motion in the motion-compensation is smaller than a predetermined value, or in both cases.

8. The image processing device according to claim 1,
wherein said super-resolution unit is configured to preferentially use an image frame that is temporally closest to a current image frame included in the low-resolution image signal, among image frames included in the high-resolution image signal, so as to perform the resolution up-converting process on the current image frame.

9. The image processing device according to claim 1,
wherein said control unit is further configured to cause said imaging unit to periodically operate in the second mode during the shooting period, and
wherein said super-resolution unit is further configured to perform the resolution up-converting process on the low-resolution image signal outputted by said imaging unit during the shooting period using the high-resolution image signal outputted by said imaging unit during the shooting period.

10. The image processing device according to claim 1,
wherein said control unit is configured to cause said imaging unit to operate in the second mode immediately after the end of the shooting period, and
wherein said super-resolution unit is configured to perform the resolution up-converting process on the low-resolution image signal outputted by said imaging unit during the shooting period using the high-resolution image signal outputted by said imaging unit immediately after the end of the shooting period.

11. The image processing device according to claim 1,
wherein said imaging unit is configured to output the low-resolution image signal at a first frame rate in the first mode, and to output the high-resolution image signal at a second frame rate in the second mode, the second frame rate being slower than the first frame rate.

12. An image processing method for use in an image processing device including an imaging unit which includes a plurality of pixels each converting light into an electrical signal, and which has a first mode in which a low-resolution image signal is outputted and a second mode in which a high-resolution image signal is outputted, the low-resolution image signal including electrical signals converted by pixels of a first number of pixels among the plurality of pixels, the high-resolution image signal including electrical signals converted by pixels of a second number of pixels among the plurality of pixels, and the second number of pixels being greater than the first number of pixels, said method comprising:
obtaining a shooting period;
causing the imaging unit to operate in the first mode during the shooting period obtained in said obtaining, and to operate in the second mode during a period other than the shooting period; and
generating a super-resolution image signal by performing a resolution up-converting process on the low-resolution image signal outputted by the imaging unit during the shooting period using the high-resolution image signal outputted by the imaging unit during the period other than the shooting period,
wherein said causing includes causing the imaging unit to operate in the second mode before a start of the shooting period or after an end of the shooting period, and
wherein said generating includes performing the resolution up-converting process on the low-resolution image signal outputted by the imaging unit during the shooting period using
(i) the high-resolution image signal outputted by the imaging unit before the start of the shooting period when said causing causes the imaging unit to operate in the second mode before the start of the shooting period or
(ii) the high-resolution image signal outputted by the imaging unit after the end of the shooting period when said causing causes the imaging unit to operate in the second mode after the end of the shooting period.

13. A non-transitory computer readable recording medium having stored thereon a program for use in an image processing device including an imaging unit which includes a plurality of pixels each converting light into an electrical signal, and which has a first mode in which a low-resolution image signal is outputted and a second mode in which a high-resolution image signal is outputted, the low-resolution image signal including electrical signals converted by pixels of a first number of pixels among the plurality of pixels, the high-resolution image signal including electrical signals converted by pixels of a second number of pixels, and the second number of pixels being greater than the first number of pixels, wherein, when executed, said program causes the image processing device to execute a method comprising:

obtaining a shooting period;

causing the imaging unit to operate in the first mode during the shooting period obtained in said obtaining, and to operate in the second mode during a period other than the shooting period; and generating a super-resolution image signal by performing a resolution up-converting process on the low-resolution image signal outputted by the imaging unit during the shooting period using the high-resolution image signal outputted by the imaging unit during the period other than the shooting period, wherein said causing includes causing the imaging unit to operate in the second mode before a start of the shooting period or after an end of the shooting period, and wherein said generating includes performing the resolution up-converting process on the low-resolution image signal outputted by the imaging unit during the shooting period using (i) the high-resolution image signal outputted by the imaging unit before the start of the shooting period when said causing causes the imaging unit to operate in the second mode before the start of the shooting period or (ii) the high-resolution image signal outputted by the imaging unit after the end of the shooting period when said causing causes the imaging unit to operate in the second mode after the end of the shooting period.

\* \* \* \* \*